(12) United States Patent
Seo et al.

(10) Patent No.: US 9,774,426 B2
(45) Date of Patent: Sep. 26, 2017

(54) METHOD FOR TRANSCEIVING CHANNEL STATE INFORMATION IN WIRELESS ACCESS SYSTEM AND APPARATUS FOR THE METHOD

(71) Applicant: LG ELECTRONICS INC., Seoul (KR)

(72) Inventors: Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/365,910

(22) PCT Filed: Jan. 11, 2013

(86) PCT No.: PCT/KR2013/000243
§ 371 (c)(1),
(2) Date: Jun. 16, 2014

(87) PCT Pub. No.: WO2013/105810
PCT Pub. Date: Jul. 18, 2013

(65) Prior Publication Data
US 2015/0023194 A1    Jan. 22, 2015

Related U.S. Application Data

(60) Provisional application No. 61/585,630, filed on Jan. 11, 2012, provisional application No. 61/599,351, (Continued)

(51) Int. Cl.
*H04L 5/00* (2006.01)
*H04W 24/10* (2009.01)
(Continued)

(52) U.S. Cl.
CPC .......... *H04L 5/0032* (2013.01); *H04B 7/024* (2013.01); *H04L 1/0027* (2013.01);
(Continued)

(58) Field of Classification Search
CPC ..... H04W 24/10; H04W 24/02; H04W 48/12; H04L 5/0053; H04L 5/0035; H04L 5/0032
See application file for complete search history.

(56) References Cited

U.S. PATENT DOCUMENTS

2009/0190528 A1* 7/2009 Chung ................. H04B 7/0417
370/328
2010/0323720 A1* 12/2010 Jen ...................... H04B 7/2606
455/456.1
(Continued)

FOREIGN PATENT DOCUMENTS

JP      2014-96796 A      5/2014
JP      2015-517258 A     6/2015
(Continued)

OTHER PUBLICATIONS

Hitachi, "Considerations on Downlink CoMP Schemes in Release 11," 3GPP TSG RAN WG1 Meeting #66bis, R1-113063, Zhuhai, China, Oct. 10-14, 2011, pp. 1-2.
(Continued)

*Primary Examiner* — Chirag Shah
*Assistant Examiner* — Srinivasa Reddivalam
(74) *Attorney, Agent, or Firm* — Birch, Stewart, Kolasch & Birch, LLP

(57) ABSTRACT

Disclosed is a method for transceiving channel state information in a wireless access system and an apparatus for the method. More particularly, the method comprises: a step of receiving, from user equipment, channel state information measurement capability indicating the total number of
(Continued)

pieces of channel state information which can be measured by the user equipment; a step of transmitting, to the user equipment, information regarding the object for channel state information measurement set in the user equipment; and a step of receiving, from the user equipment, channel state information measured in the object for channel state information measurement. The object for channel state information measurement is restrictively set such that the total number of the objects for channel state information measurement is the same as or less than the channel state information measurement capability.

10 Claims, 16 Drawing Sheets

Related U.S. Application Data filed on Feb. 15, 2012, provisional application No. 61/661,789, filed on Jun. 19, 2012.

(51) Int. Cl.
*H04W 24/02* (2009.01)
*H04B 7/024* (2017.01)
*H04L 1/00* (2006.01)
*H04W 48/12* (2009.01)

(52) U.S. Cl.
CPC ........... *H04L 1/0029* (2013.01); *H04W 24/02* (2013.01); *H04W 24/10* (2013.01); *H04L 5/001* (2013.01); *H04L 5/0053* (2013.01); *H04L 5/0073* (2013.01); *H04W 48/12* (2013.01)

(56) References Cited

U.S. PATENT DOCUMENTS

| | | | |
|---|---|---|---|
| 2011/0194551 | A1 | 8/2011 | Lee et al. |
| 2011/0235743 | A1* | 9/2011 | Lee ................ H04L 5/0048 375/295 |
| 2011/0305161 | A1 | 12/2011 | Ekpenyoung et al. |
| 2012/0076017 | A1* | 3/2012 | Luo ................ H04L 1/0027 370/252 |
| 2012/0120842 | A1 | 5/2012 | Kim et al. |
| 2012/0207044 | A1* | 8/2012 | Johansson ............. H04W 24/10 370/252 |
| 2012/0213261 | A1* | 8/2012 | Sayana ................ H04L 5/0094 375/224 |
| 2013/0010880 | A1* | 1/2013 | Koivisto ............. H04B 7/0469 375/259 |
| 2013/0258965 | A1 | 10/2013 | Geirhofer et al. |
| 2013/0343301 | A1 | 12/2013 | Geirhofer et al. |
| 2014/0086353 | A1 | 3/2014 | Ni et al. |
| 2014/0119266 | A1 | 5/2014 | Ng et al. |
| 2015/0124638 | A1 | 5/2015 | Sun et al. |
| 2015/0295694 | A1 | 10/2015 | Li et al. |

FOREIGN PATENT DOCUMENTS

| | | |
|---|---|---|
| JP | 2015-523023 A | 8/2015 |
| JP | 2015-525031 A | 8/2015 |
| JP | 2015-532568 A | 11/2015 |
| JP | 2016-503604 A | 2/2016 |
| KR | 10-2011-0011507 A | 2/2011 |
| KR | 10-2011-0091839 A | 8/2011 |
| WO | WO 2011/013990 A2 | 2/2011 |
| WO | WO 2011/127092 A1 | 10/2011 |
| WO | WO 2011/157182 A2 | 12/2011 |
| WO | WO 2013/148347 A1 | 10/2013 |
| WO | WO 2013/192482 A1 | 12/2013 |
| WO | WO 2014/005386 A1 | 1/2014 |

OTHER PUBLICATIONS

ZTE, "CSI-RS configurations for CoMP," 3GPP TSG RAN WG1 Meeting #67, R1-113762, San Francisco, USA, Nov. 14-18, 2011, pp. 1/3-3/3.
ZTE, "Views on Rel-11 CoMP," 3GPP TSG RAN WG1 Meeting #63bis, R1-110573, Dublin, Ireland, Jan. 17-21, 2011, pp. 1-2.
Alcatel-Lucent, "Status Report for RAN WG1 to TSG-RAN #58," 3GPP TSG RAN #58, RP-121968, Barcelona, Spain, Dec. 4-7, 2012, 28 pages.
Ericsson et al., "Clarification on DL CoMP Rel-11 UE Capabilities," 3GPP, Meeting: R1-70b, R1-124662, http://www.3gpp.org/DynaReport/TDocExMtg--R1-70b--29004.htm, San Diego, USA, Oct. 8-Oct. 12, 2012, 4 pages.
ST-Ericsson et al., "Way Forward for Definition of Performance Requirements for Comp and Quasi Colocated Antennas," 3GPP TSG-RAN WG4 Meeting #65, R4-126661, New Orleans, Luisiana [sic], USA, Nov. 12-16, 2012, 3 pages.

* cited by examiner

FIG. 11
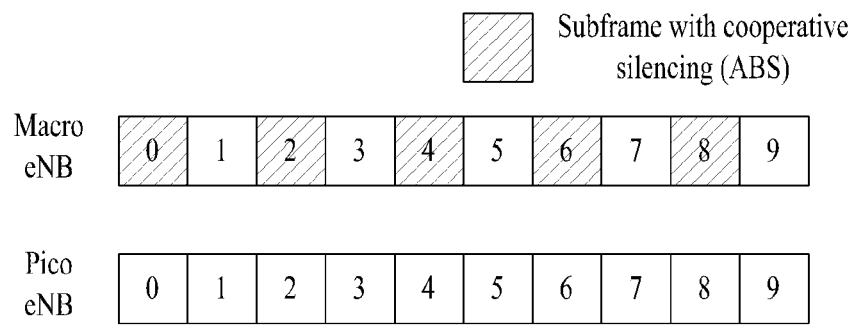
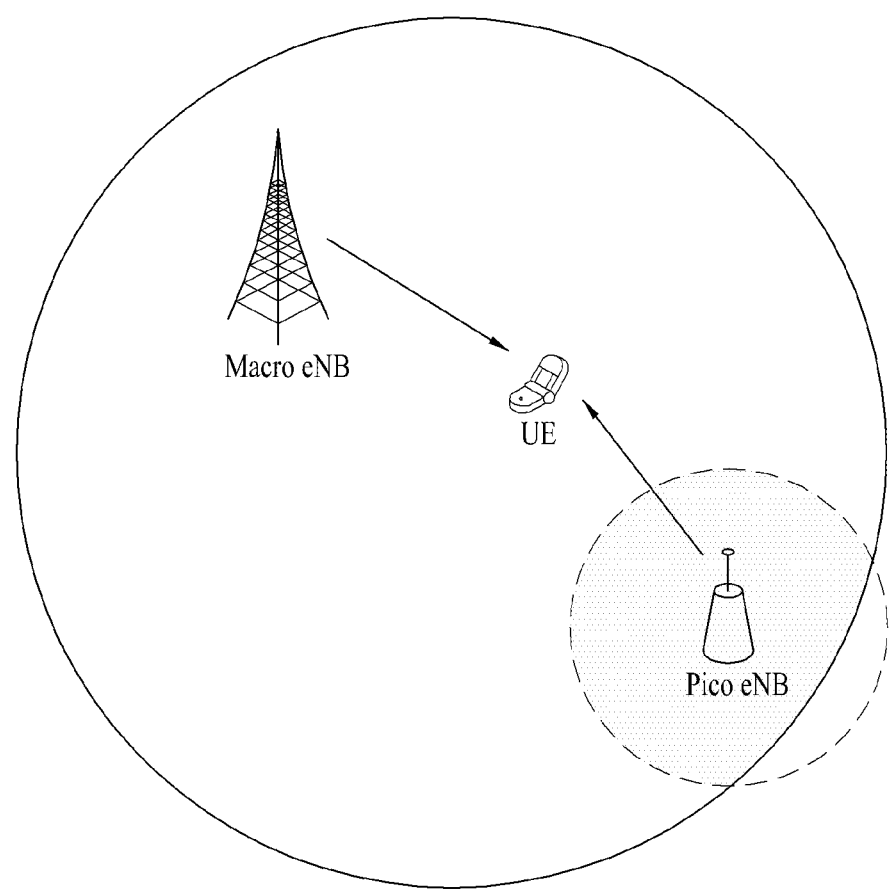

METHOD FOR TRANSCEIVING CHANNEL STATE INFORMATION IN WIRELESS ACCESS SYSTEM AND APPARATUS FOR THE METHOD

This application is the National Phase of PCT/KR2013/000243 filed on Jan. 11, 2013 which claims priority under 35 U.S.C. 119(e) to U.S. Provisional Application Nos. 61/585,630 filed on Jan. 11, 2012, 61/599,351 filed on Feb. 15, 2012 and 61/661,789 filed on Jun. 19, 2012, all which are hereby expressly incorporated by reference into the present application.

TECHNICAL FIELD

The present invention relates to a wireless access system, and more particularly, to a method of transceiving channel state information measured from an object of measuring the channel state information which is allocated according to a user equipment in the wireless access system and an apparatus therefor.

BACKGROUND ART

A mobile communication system has been developed to provide an audio service to a user while securing mobility of the user. Yet, the mobile communication system is gradually expanding its service area not only the audio service but also a data service and has developed to the extent as much as providing fast data service nowadays. Yet, since the currently providing mobile communication system is experiencing a lack of resources and users are requiring a faster service, a more advanced mobile communication system is required.

One of most important things of a next generation wireless access system is to satisfy data transfer rate demand. To this end, ongoing effort to develop various technologies including MIMO (multiple input multiple output), CoMP (cooperative multiple point transmission), a relay and the like is in progress. Moreover, in order to accommodate increasing wireless data demand, application of a heterogeneous network consisting of macro-pico or macro-femto is expanding.

As mentioned in the foregoing description, while a situation in which a user equipment can be placed is variously expanding due to the various technologies, it is necessary to have a method of appropriately measuring channel state of the user equipment in accordance with the situation in which the user equipment is placed.

DISCLOSURE OF THE INVENTION

Technical Tasks

One object of the present invention is to provide a method for a user equipment to smoothly measure and report channel state in a wireless access system and an apparatus therefor.

Another object of the present invention is to provide a method for a wireless access system, preferably, a user equipment to flexibly set a channel measurement object to perform channel measurement and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, disclosed herein is a method for receiving CSI (channel state information) in a wireless access system, the method including receiving, from the user equipment, a CSI measurement capability indicating a total number of CSI measurable by the user equipment; transmitting, to the user equipment, information about a CSI measurement object configured for the user equipment; and receiving, from the user equipment, CSI measured for the CSI measurement object, wherein the CSI measurement object is configured such that the total number of the CSI measurement object is restricted to have a number equal to or less than the CSI measurement capability.

In another aspect of the present invention, disclosed herein is a base station receiving CSI (channel state information) in a wireless access system, the base station including an RF (radio frequency) unit configured to transceive a radio signal; and a processor configured to receive, from a user equipment, a CSI measurement capability indicating a total number of CSI measurable by a user equipment, transmit, to the user equipment, information about a CSI measurement object configured for the user equipment, and receive, from the user equipment, CSI measured for the CSI measurement object, wherein the CSI measurement object is configured such that the total number of the CSI measurement object is restricted to have a number equal to or less than the CSI measurement capability.

Preferably, alternately or additionally, the CSI measurement object is comprises a combination of a resource for measuring a signal usable for calculating the CSI and a resource for measuring an interference usable for calculating the CSI.

Preferably, alternately or additionally, the resource for measuring the interference usable for calculating the CSI is classified into a subframe set in which a neighboring base station performs a silencing operation for time domain ICIC (inter-cell interference coordination) and a subframe set in which the neighboring base station does not perform the silencing operation.

Preferably, alternately or additionally, the resource for measuring the signal usable for calculating the CSI is classified according to a reference signal transmission resource of each base station participating in CoMP (coordinated multi-point).

Preferably, alternately or additionally, the resource for measuring the signal usable for calculating the CSI is classified according to a non-zero power CSI-RS resource, and the resource for measuring the interference usable for calculating the CSI is classified according to an interference measurement resource.

Preferably, alternately or additionally, the total number of the CSI measurement object is determined per each component carrier activated in the user equipment.

Preferably, alternately or additionally, the CSI measurement object includes measurement of the CSI for joint transmission by a plurality of base stations.

Preferably, alternately or additionally, the restriction on the total number of the CSI measurement object is applied to both a periodic CSI report and an aperiodic CSI report.

In another aspect of the present invention, disclosed herein is a method for transmitting CSI (channel state information) in a wireless access system, the method including transmitting, to a base station, a CSI measurement capability indicating a total number of CSI measurable by a user equipment; receiving, from the base station, information about a CSI measurement object configured for the user equipment; and transmitting, to the base station, CSI measured for the CSI measurement object, wherein the CSI measurement object is configured such that the total number of the CSI measurement object is restricted to have a number equal to or less than the CSI measurement capability.

In another aspect of the present invention, disclosed herein is a user equipment transmitting CSI (channel state information) in a wireless access system, the user equipment including an RF (radio frequency) unit configured to transceive a radio signal; and a processor configured to transmit, to a base station, a CSI measurement capability indicating a total number of CSI measurable by a user equipment, receive, from the base station, information about a CSI measurement object configured for the user equipment, transmit, to the base station, CSI measured for the CSI measurement object, wherein the CSI measurement object is configured such that the total number of the CSI measurement object is restricted to have a number equal to or less than the CSI measurement capability.

Preferably, alternately or additionally, the CSI measurement object comprises a combination of a resource for measuring a signal usable for calculating the CSI and a resource for measuring interference usable for calculating the CSI.

Preferably, alternately or additionally, the resource for measuring the interference usable for calculating the CSI is classified into a subframe set in which a neighboring base station performs a silencing operation for time domain ICIC (inter-cell interference coordination) and a subframe set in which the neighboring base station does not perform the silencing operation.

Preferably, alternately or additionally, the resource for measuring the signal usable for calculating the CSI is classified according to a reference signal transmission resource of each base station participating in CoMP (coordinated multi-point).

Preferably, alternately or additionally, the resource for measuring the signal usable for calculating the CSI is classified according to a non-zero power CSI-RS resource, and the resource for measuring the interference usable for calculating the CSI is classified according to an interference measurement resource.

Preferably, alternately or additionally, the total number of the CSI measurement object is determined per each component carrier activated in the user equipment.

Preferably, alternately or additionally, the CSI measurement object includes measurement of the CSI for joint transmission by a plurality of base stations.

Preferably, alternately or additionally, the restriction on the total number of the CSI measurement object is applied to both a periodic CSI report and an aperiodic CSI report.

Advantageous Effects

According to embodiment of the present invention, a user equipment can smoothly measure and report a channel state with a base station in a wireless access system.

According to embodiment of the present invention, it is able to more efficiently identify a channel state of a user equipment in a manner of flexibly setting a channel measurement object according to a capability of measuring channel state information of the user equipment.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 11 to FIG. 16 are diagrams for examples of a measurement object of channel state information according to one embodiment of the present invention;

MODE FOR INVENTION

Figure 1:
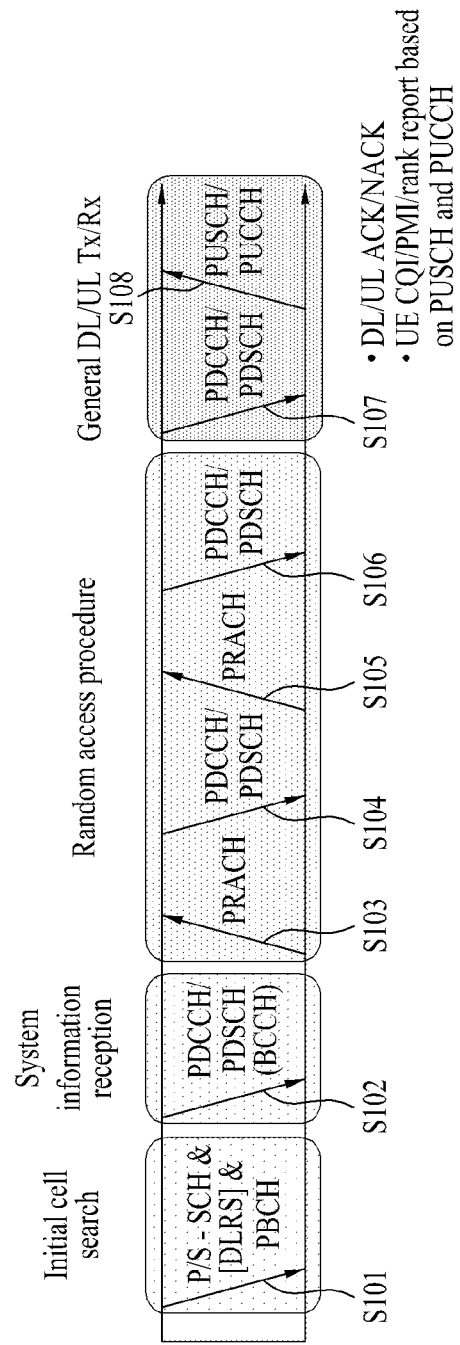
FIG. 1 is a diagram for explaining physical channels used for 3GPP LTE system and a general signal transmission method using the physical channels.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a user equipment. In this case, the base station has a meaning of a terminal node of a network directly communicating with a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), an AMS (advanced mobile station, a WT (wireless terminal), an MTC (machine-type communication) device, an M2M (machine-to-machine) device, a D2D (device-to-device) device or the like.

Specific terminologies used in the following description are provided to help understand the present invention and the use of the specific terminologies can be modified into a different form in a range of not deviating from the technical idea of the present invention.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3$^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the present invention mainly concerns 3GPP LTE/LTE-A, by which the technical characteristic of the present invention may be non-limited.

1. 3GPP LTE/LTE-A System to which the Present Invention is Applicable 1. 1. The General of System FIG. 1 is a diagram for explaining physical channels used for 3GPP system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain more detailed system information [S102].

Subsequently, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
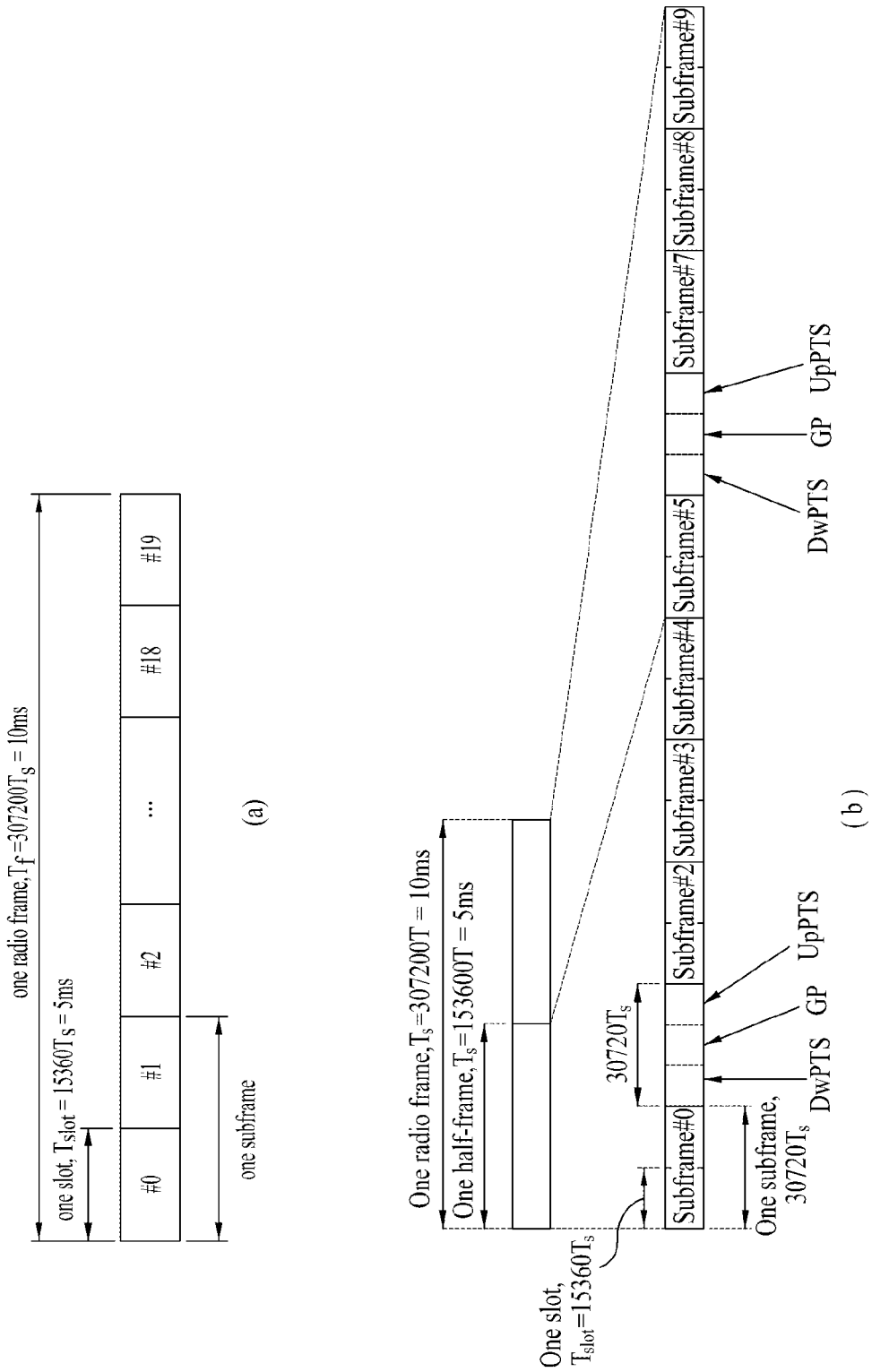
FIG. 2 is a diagram for a structure of a radio frame in 3GPP LTE system.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2 (*a*) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching a uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
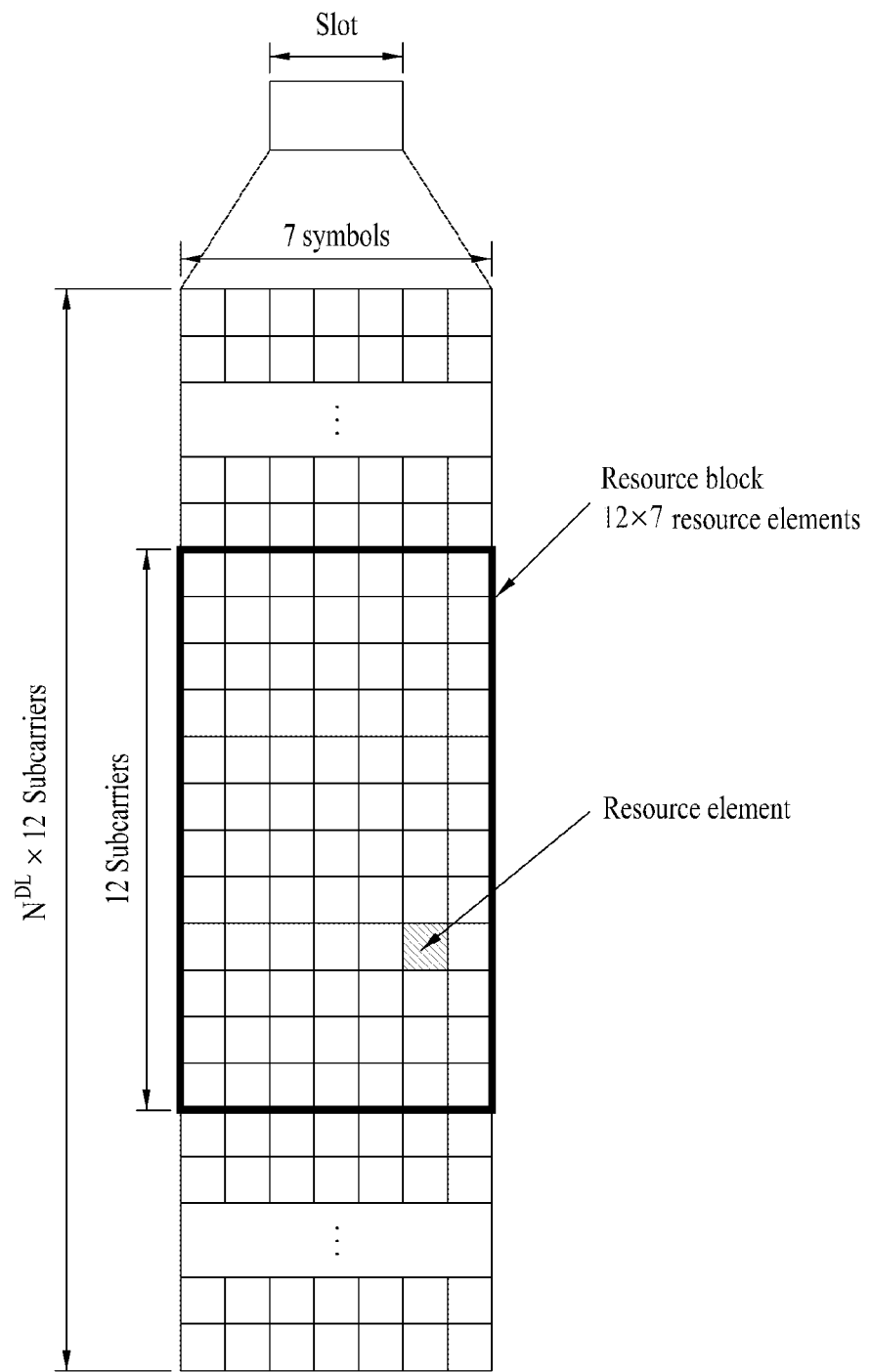
FIG. 3 is a diagram for an example of a resource grid for one downlink slot.

FIG. 3 is a diagram for an example of a resource grid for one downlink slot.

Referring to FIG. 3, one downlink slot includes a plurality of OFDM symbols in time domain. In this case, one downlink (DL) slot includes 7 OFDM symbols and one resource block (RB) includes 12 subcarriers in frequency domain, by which the present invention may be non-limited.

Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
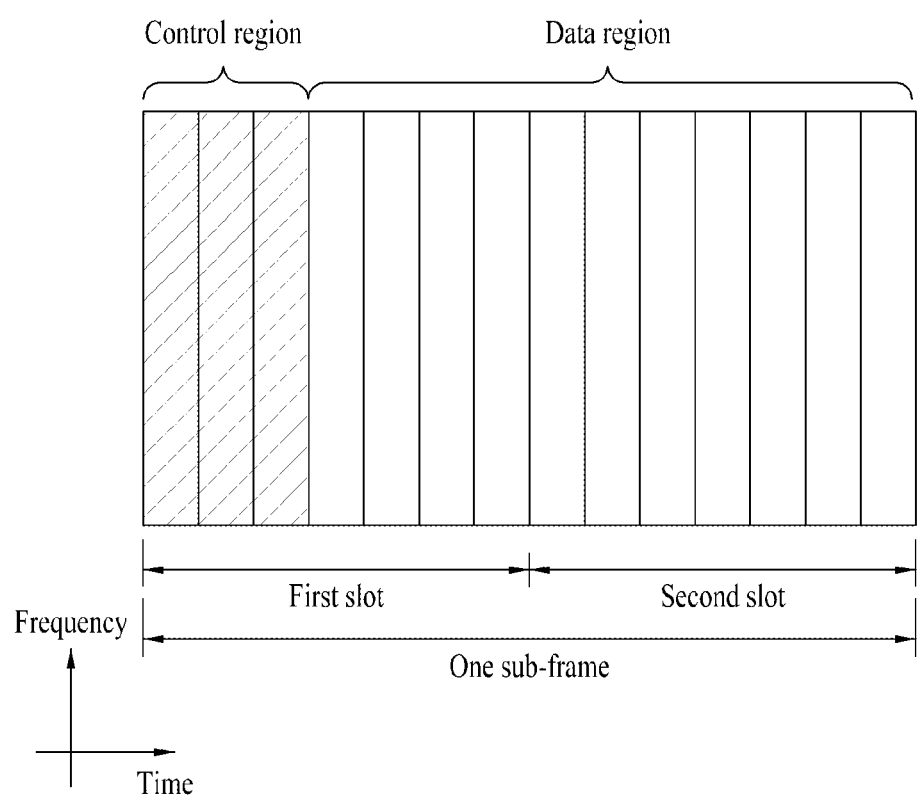
FIG. 4 is a diagram for a structure of a downlink subframe.

FIG. 4 is a diagram for a structure of a downlink subframe.

Referring to FIG. 4, Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols (i.e., a size of a control region) used for a transmission of control channels within the subframe. The PHICH is a response channel in response to UL transmission and carries ACK (acknowledgement)/NACK (not-acknowledgement) signals for a HARQ (hybrid automatic repeat request). Control information carried on PDCCH may be called downlink control information (hereinafter abbreviated DCI). The DCI may include UL resource allocation information, DL resource allocation information or a UL transmit power control command for a random UE (user equipment) group.

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 5:
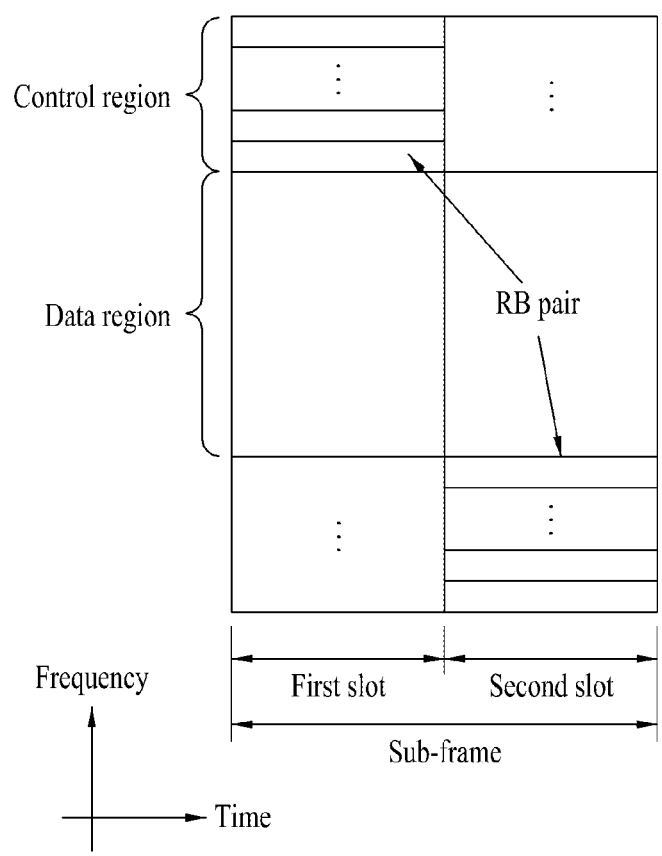
FIG. 5 is a diagram for a structure of an uplink subframe.

FIG. 5 is a diagram for a structure of an uplink subframe.

Referring to FIG. 5, a UL subframe may be divided into a control region and a data region in frequency domain. A physical UL control channel (PUCCH), which carries UL control information, is assigned to the control region. And, a physical UL shared channel (PUSCH), which carries user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

1. 2. MIMO (Multi-Input Multi-Output) System Modeling

MIMO technology corresponds to an abbreviation of Multi-Input Multi-Output technology. Instead of generally using a single transmitting antenna and a single receiving antenna, the MIMO technology uses multiple transmitting (Tx) antennas and multiple receiving (Rx) antennas. In other word, the MIMO technology is a technology using a plurality of the antennas at a transmitting end or a receiving end in a radio communication system to increase a capacity and enhance performance. In the following description, the MIMO may be called a 'multi input/output antenna'.

More specifically, the multi input/output antenna technology may not depend on a single antenna path to receive a total message. Data is completed in a manner of combining data fragments received from many antennas in one place in the multi input/output antenna technology instead. Consequently, when the multi input/output antenna technology is used, a data transmission speed may be enhanced in a specific system coverage or the system coverage may be enlarged via the specific data transmission speed.

Since a next generation mobile communication requires much faster data transmission speed compared to a conventional mobile communication, it is anticipated that the efficient multi input/output antenna technology is essentially required. Under this circumstance, the MIMO communication technology may correspond to a next generation mobile communication technology capable of widely being used for a mobile communication terminal, a relay node, and the like. The MIMO communication technology is getting a spotlight as a technology capable of overcoming traffic limit of a different mobile communication due to the expansion of data communication and the like.

Meanwhile, the multi input/output (MIMO) antenna technology among the currently studied various transmission efficiency enhancing technologies corresponds to the method capable of considerably enhancing communication traffic and transmission/reception performance without an additional frequency assignment or power increase. Thus, the multi input/output (MIMO) antenna technology currently receives most attention.

Figure 6:
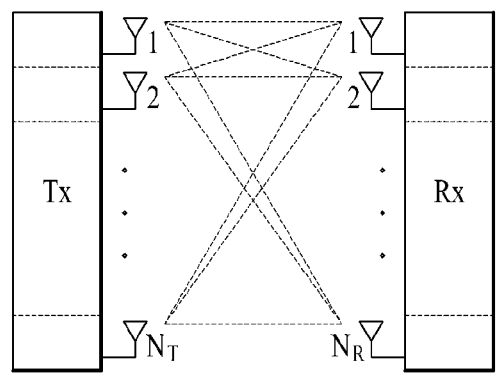
FIG. 6 is a diagram for a general MIMO (multiple input multiple output) communication system.

FIG. 6 is a diagram for a structure of a general multiple input multiple output (MIMO) antenna communication system.

Referring to FIG. 6, $N_T$ number of transmitting antenna is installed in a transmitting end and $N_R$ number of receiving antenna is installed in a receiving end simultaneously. In case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as ($R_o$) in case of using a single antenna, the transfer rate according to the increase of the channel transmission capacity can be theoretically increased as much as the maximum transfer rate ($R_o$) multiplied by a rate of increase $R_i$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system.

The MIMO antenna technology can be divided into a spatial diversity scheme enhancing transmission reliability using symbols passed through various channel paths and a spatial multiplexing scheme increasing transmission rate by simultaneously transmitting a plurality of data symbols using a plurality of transmitting antennas. And, many ongoing efforts are made to obtain the merit of each scheme in a manner of appropriately combining both of the two schemes.

Each of the schemes is explained in more detail in the following description.

First of all, the spatial diversity scheme includes a space-time block code scheme and a space-time Trelis coding scheme simultaneously using diversity gain and a coding gain. In general, the Trelis coding scheme is superior in a bit error rate improving performance and a code generation. Yet, the space-time block code scheme is simpler than the Trelis coding scheme in terms of calculation complexity. The spatial diversity gain can be obtained as many as the number ($N_T * N_R$) resulted from multiplying the number of transmitting antenna ($N_T$) by the number of receiving antenna ($N_R$).

Secondly, the spatial multiplexing scheme is the scheme transmitting data rows different with each other in each of transmitting antennas. In this case, interference occurs at a receiver between simultaneously transmitted data from a transmitter. The receiver receives the data in a manner of eliminating the interference using an appropriate signal processing scheme. A noise rejection scheme used for the above situation may include an MLD (maximum likelihood detection) receiver, a ZF (zero-forcing) receiver, an MMSE (minimum mean square error) receiver, a D-BLAST (Diagonal-Bell Laboratories Layered Space-Time), a V-BLAST (Vertical-Bell Laboratories Layered Space-Time), and the like. In particular, in case that a transmitting end is able to know channel information, a SVD (singular value decomposition) scheme can be used.

Thirdly, there exists a scheme combined the spatial diversity and the spatial multiplexing. In case of obtaining the spatial diversity gain only, performance improvement gain is gradually saturated according to the increase of the order of diversity. In case of obtaining the spatial multiplexing gain only, transmission reliability is degraded in a radio channel. Schemes obtaining two kinds of merit as well solving the aforementioned problems have been studied and may include a double space-time block code (double-STTD) scheme, a space-time BICM (STBICM) scheme, and the like.

In order to explain the aforementioned communication method in a MIMO antenna system with a detailed method, a mathematical modeling is described as follows.

First of all, assume that there exist $N_T$ number of transmitting antenna and $N_R$ number of receiving antenna as shown in FIG. 6.

First of all, if we look into a transmission signal, since the maximum number of information capable of being transmitted is $N_T$ in case that there exists $N_T$ number of transmitting antenna, transmission information can be represented as a vector in the following.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, the $N_T$ number of transmission signal $x_1$, $x_2, \ldots, x_{N_T}$, which is practically transmitted, is configured in a manner of applying a weighted matrix W to the transmit power adjusted information vectors Ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Formula 5]

$$W\hat{s} = WPs$$

In this case, $W_{ij}$ means a weighting between an $i^{th}$ transmitting antenna and $j^{th}$ transmission information. The W is called the weighted matrix or a precoding matrix.

Meanwhile, the aforementioned transmission signal (x) can be considered in a manner of dividing into a case of using the spatial diversity and a case of using the spatial multiplexing.

In case of using the spatial multiplexing, since the signals different from each other are transmitted in a manner of being multiplexed, elements of the information vector S have a value different from each other. On the contrary, in case of using the spatial diversity, since an identical signal is transmitted via a plurality of channel paths, the elements of the information vector S have a same value.

Of course, it is possible to consider a method of combining the spatial multiplexing and the spatial diversity. In particular, for instance, a case that an identical signal is transmitted via 3 transmitting antennas using the spatial diversity and the rest of antennas transmit the signals different from each other using the spatial multiplexing can be considered as well.

In case that there exist $N_R$ number of receiving antenna, a reception signal of each antenna $y_1, y_2, \ldots, y_{NR}$ can be represents as a vector y as follows.

$$y=[y_1,y_2,\ldots,y_{N_R}]^T$$ [Formula 6]

Meanwhile, in case of modeling a channel in a MIMO antenna communication system, each channel can be distinguished according to an index of transmitting/receiving antenna. A channel passing through a transmitting antenna j and a receiving antenna i is represented as a $h_{ij}$. In this case, be cautious that the index of a receiving antenna is preceding and the index of a transmitting antenna is following in the order of the index of $h_{ij}$.

These channels can be represented as a vector or a matrix in a manner of binding a plurality of channels together. An example of representing a vector is described as follows.

Figure 7:
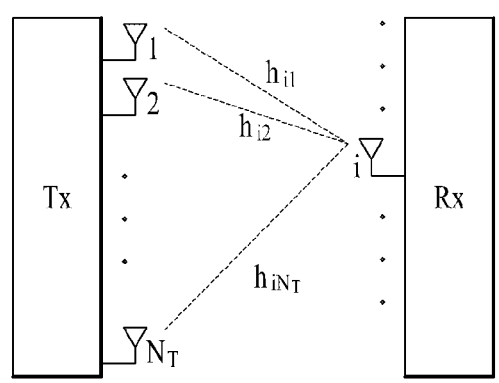
FIG. 7 is a diagram for channels from the $N_T$ number of transmitting antennas to a receiving antenna i.

FIG. 7 is a diagram for channels from $N_T$ transmitting antenna to a receiving antenna i.

As shown in FIG. 7, channels starting from a total $N_T$ number of transmitting antenna to a receiving antenna i can be represented as follows.

$$h_i^T=[h_{i1},h_{i2},\ldots,h_{iN_T}]$$ [Formula 7]

And, in case that channels passing through $N_T$ number of transmitting antenna and $N_R$ number of receiving antenna are represented by a matrix form such as the Formula 7, it can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix}$$ [Formula 8]

Meanwhile, since an Additive White Gaussian Noise (AWGN) is added to a practical channel after the channel passes through the channel matrix H, the Additive White Gaussian Noise $n_1, n_2, \ldots, n_{NR}$ added to each of the $N_R$ number of receiving antenna can be represented as follows.

$$n=[n_1,n_2,\ldots,n_{N_R}]^T$$ [Formula 9]

By modeling the aforementioned transmission signal, the reception signal, the channel, and the Additive White Gaussian Noise, each of the transmission signal, the reception signal, the channel, and the Additive White Gaussian Noise in a MIMO antenna communication system can be represented via a relationship as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_R} \end{bmatrix} + \begin{bmatrix} n_1 \\ n_2 \\ \vdots \\ n_i \\ \vdots \\ n_{N_R} \end{bmatrix} =$$ [Formula 10]

$$Hx + n$$

Meanwhile, the number of row and column of the channel matrix H, which indicate a state of a channel, is determined by the number of transmitting and receiving antenna. As mentioned in the foregoing description, in the channel matrix H, the number of column becomes identical to the number of receiving antenna $N_R$ and the number of row becomes identical to the number of transmitting antenna $N_T$. In particular, the channel matrix H becomes $N_R * N_T$ matrix.

In general, a rank of a matrix is defined by a minimum number of the number of row or column independent from each other. Hence, the rank of the matrix is configured not to be greater than the number of the row or the column. For instance, the rank of a channel matrix H (rank (H)) is limited as follows.

$$\text{rank}(H) \leq \min(N_T, N_R)$$ [Formula 11]

In particular, when Eigen value decomposition is performed on a matrix, a rank can be defined by the number of Eigen values, which is not a '0' among the Eigen values. Similarly, a rank can be defined by the number of singular values, which is not '0' when SVD (singular value decomposition) is performed on the matrix. Hence, a physical meaning of a rank of a channel matrix may indicate a maximum number capable of transmitting different information from each other in a given channel.

In the present specification, a 'rank' for MIMO transmission indicates the number of path capable of independently transmitting a signal on a specific timing point and a specific frequency resource. 'The number of layer' indicates the number of signal stream transmitted via each path. In general, since a transmitting end transmits layers in response to the number of rank used for transmitting a signal, the rank may have a same meaning with the number of layer unless there is a special comment.

1. 3. Coordinated Multi-Point (CoMP) System

To keep up with a request of LTE-advanced, a coordinated multi-point (hereinafter abbreviated CoMP) transmission is proposed to enhance system performance. The CoMP is also called a co-MIMO, a collaborative MIMO, a network MIMO, and the like. It is anticipated that the CoMP enhances the performance of a user equipment situated at a cell boundary and increases the throughput of an average cell (sector).

In general, inter-cell interference decreases the performance of a user equipment situated at a cell boundary and the throughput of an average cell (sector) in a multi-cell environment, which frequency reuse index corresponds to 1. In order to reduce the inter-cell interference, LTE system adopted a simple and passive method such as a fractional frequency reuse (FFR) for a user equipment situated at a cell boundary to have a reasonable performance efficiency in an interference-limited environment. Yet, instead of reducing the use of frequency resource per each cell, a method of reusing the inter-cell interference or reducing the inter-cell interference with a signal (desired signal), which should be received by a user equipment, is more profitable. In order to achieve the aforementioned purpose, the CoMP transmission scheme can be applied.

The CoMP scheme applicable to a downlink can be classified into a JP (joint processing) scheme and a CS/CB (coordinated scheduling/beamforming) scheme.

According to the JP scheme, data can be used in each point (base station) of CoMP unit. The CoMP unit means an aggregation of base stations used by the CoMP scheme. The JP scheme can be classified into a joint transmission scheme and a dynamic cell selection scheme again.

The joint transmission scheme means a scheme that signals are simultaneously transmitted on PDSCH from a plurality of points, which corresponds to a whole or a part of the CoMP unit. In particular, data transmitted to single user equipment can be simultaneously transmitted from a plurality of the transmission points. By using the joint transmission scheme, quality of a signal transmitted to a user equipment can be enhanced irrespective of a coherent signal or a non-coherent signal and may be able to actively eliminate the interference with a different user equipment.

The dynamic cell selection scheme means a scheme that a signal is transmitted on PDSCH from a single point. In particular, data transmitted to single user equipment on a specific time is transmitted from a single point and different points in the CoMP unit do not transmit data to the user equipment. The point transmitting the data to the user equipment can be dynamically selected.

According to the CS/CB scheme, the CoMP unit performs a beamforming in a manner of cooperating for a data transmission to the single user equipment. In particular, although the data is transmitted to the user equipment by a serving cell only, a user scheduling/beamforming can be determined by the cooperation of a plurality of the cells in the CoMP unit.

In case of UL, CoMP reception means to receive a signal transmitted by the cooperation of a plurality of the points which are geographically separated. The CoMP scheme applicable to the UL can be classified into a JR (joint reception) scheme and a CS/CB (coordinated scheduling/beamforming) scheme.

The JR scheme means a scheme receiving signals transmitted on PDSCH by a plurality of points, which corresponds to a whole or a part of the CoMP unit. According to the CS/CB scheme, although a signal transmitted on PDSCH is received by a single point only, a user scheduling/beamforming can be determined by the cooperation of a plurality of the cells in the CoMP unit.

1. 4. Downlink Measurement

When a packet (or signal) is transmitted in a wireless communication system, since the packet is transmitted via a radio channel, a signal may be distorted in the course of transmission. In order for a receiving end to correctly receive the distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal known to both the transmitting end and the receiving end is called a pilot signal or a reference signal.

When a data is transmitted and received by a transmitting end or a receiving end using MIMO antenna to increase capacity and communication performance, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

In a wireless communication system, a reference signal is mainly classified into two kinds according to the usage of the reference signal. The reference signal includes a reference signal used for obtaining channel information and a reference signal used for data demodulation. Since the former one is used for a user equipment to obtain the channel information in downlink, it is necessary to be transmitted by a wide band. Although a user equipment does not receive downlink data in a specific subframe, the user equipment should be able to receive and measure the reference signal. The reference signal used for measuring the channel can be used for handover measuring and the like. The latter one corresponds to a reference signal transmitted to a corresponding resource together with a downlink signal when a base station transmits the downlink signal. A user equipment can perform channel estimation by receiving the reference signal and may be then able to demodulate data. The reference signal used for data demodulation should be transmitted to a region to which data is transmitted.

As a downlink reference signal, 3GPP LTE system defines a CRS (common reference signal) shared by all user equipments in a cell and a DRS (dedicated reference signal) used for a specific user equipment. The CRS is used for two purposes including channel information acquisition and data demodulation. The CRS is also called a cell-specific RS. A base station transmits the CRS in every subframe over a wide band. On the contrary, the DRS is used for data demodulation only. if data demodulation on PDSCH is required, the DRS can be transmitted via resource elements. A user equipment can receive information on whether the DRS exists via an upper layer and the DRS is valid only when the DRS is mapped to corresponding PDSCH. The DRS can also be called a UE-specific RS or a DMRS (demodulation RS).

A receiving side (UE) can feedback such an indicator related to channel quality as CQI (channel quality indicator), PMI (precoding matrix index) and/or RI (rank indicator) to a transmitting side (base station) by estimating a channel state from the CRS. Or, a reference signal, which is related to a feedback of CSI (channel state information) such as CQI/PMI/RI, can be separately defined as a CSI-RS. Unlike a legacy CRS used for channel measurement and data demodulation at the same time, the CSI-RS used for measuring a channel is designed to mainly measure a channel. Hence, since the CSI-RS is transmitted to obtain information on a channel state, a base station transmits CSI-RS for all antenna ports. Unlike the DRS, since the CSI-RS is transmitted to obtain downlink channel information, the CSI-RS is transmitted to all bandwidths.

Current 3GPP LTE system defines two kinds of transmission schemes including an open-loop MIMO which is managed without channel information of a receiving end and a closed-loop MIMO. In order to obtain multiplexing gain of MIMO antennas in the closed-loop MIMO, a transmitting end and the receiving end respectively perform beamforming based on channel information, i.e., channel state information (CSI). In order for a base station to obtain the CSI from a user equipment, the base station assigns PUCCH (physical uplink control channel) or PUSCH (physical uplink shared channel) to the user equipment and commands the user equipment to feedback downlink CSI.

The CSI is mainly classified into 3 kinds of information including RI (rank indicator), PMI (precoding matrix index) and CQI (channel quality indication).

The RI indicates rank information of a channel and means the number of signal stream (or layer) received via an identical frequency time resource by a user equipment. Since a value of the RI is dominantly determined by a long term fading of a channel, the value of the RI is fed back to a base station with an interval longer than a PMI and CQI value in general.

The PMI is a value to which a spatial characteristic of a channel is reflected. The PMI indicates a precoding index of a base station preferred by a user equipment on the basis of a metric including a SINR (signal to interference plus noise ratio. In particular, the PMI is information on a precoding matrix used for transmission of a transmitting end. The precoding matrix feedback by a receiving end is determined in consideration of the number of layers indicated by the RI. The PMI can be fed back in case of closed-loop multiplexing and large delay CDD transmission. In case of open-loop transmission, the transmitting end can select the precoding matrix according to a predetermined rule. A process for the receiving end to select the PMI for each rank is described in the following. The receiving end calculates previously processed SINR for each PMI, converts the calculated SINR into sum capacity and may be then able to select best PMI based on the sum capacity. In particular, calculating the PMI may correspond to a process of finding out the best PMI based on the sum capacity by the receiving end. Having fed back the PMI from the receiving end, the transmitting end can use the precoding matrix recommended by the receiving end as it is and may include the aforementioned event in data transmission scheduling allocation information, which is transmitted to the receiving end, as an indicator of 1-bit long. Or, the transmitting end may not use the precoding matrix indicated by the PMI, which is fed back from the receiving end, as it is. In this case, precoding matrix information, which is used by the transmitting end to transmit data to the receiving end, can be explicitly included in the scheduling allocation information.

The CQI is a value indicating strength of a channel and means a reception SINR capable of being obtained when a base station uses the PMI in general. A user equipment reports a CQI index, which indicates a specific combination in a set consisting of combinations of a predetermined modulation scheme and a code rate, to a base station.

In a more enhanced communication system such as LTE-A system, additional multi-user diversity gain using MU-MIMO (multi-user MIMO) is added. A MU-MIMO technology is a technology that a base station allocates each antenna resource to a different user equipment. The MU-MIMO technology is a scheduling scheme that the base station selects a user equipment capable of transmitting fast data according to an antenna. For the multi-user diversity gain, higher accuracy is required in terms of a channel feedback. This is because since there exists an interference channel between user equipments which are multiplexed in an antenna domain in MU-MIMO, the accuracy of the feedback channel considerably influences on not only a user equipment transmitting feedback but also a different user equipment as interference. Hence, in order to improve the accuracy of the feedback channel, LTE-A system has determined to design a final PMI which is divided into two kinds including a W1 corresponding to a long term and/or wideband PMI and a W2 corresponding to a short term and/or a sub-band PMI. The final PMI can be determined by a combination of the W1 and the W2.

As an example of a hierarchical codebook transformation scheme for constructing a single final PMI from two channel information, i.e., the W1 and W2, a codebook can be transformed using a long-term covariance matrix shown in Formula 12 in the following.

$$W = \text{norm}(W1\,W2) \qquad \text{[Formula 12]}$$

Referring to Formula 12, the W2 (short term PMI) corresponds to a code word of a codebook which is made to reflect short-term channel information, the W1 indicates a long-term covariance matrix and norm(A) a matrix that a norm is normalized by 1 according to each column of a matrix A. W indicates a code word of a final codebook that is transformed. A concrete structure of a legacy W1 and W2 is shown in Formula 13 in the following.

$$W1(i) = \begin{bmatrix} X_i & 0 \\ 0 & X_i \end{bmatrix}, \text{ where } X_i \text{ is } Nt/2 \text{ by } M \text{ matrix.} \qquad \text{[Formula 13]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r\,columns} (\text{if rank} = r),$$

where $1 \leq k, l, m \leq M$ and $k, l, m$ are integer.

In Formula 13, the W1 can be defined in a block diagonal matrix form. Each block corresponds to an identical matrix and one block ($X_i$) can be defined by a matrix of a ($N_t/2$)*M size. In this case, $N_t$ corresponds to the number of transmitting antenna. Regarding the W2, $e_M^p$ (p=k, l, . . . , m) corresponds to a vector of M*1 size, $p^{th}$ component among M number of vector components corresponds to 1 and remaining components correspond to vectors which are 0. When the $e_M^p$ is multiplied by the W1, since a $P^{th}$ column is selected from the columns of the W1, this sort of vector can be called a selection vector. In this case, in order to represent a long term/wideband channel, as an M value becomes greater, the number of vector, which is fed back at once, becomes greater, thereby improving the accuracy of the feedback. Yet, as the M value becomes greater, a codebook size of the W1, which is fed back with a low frequency, is decreasing and the codebook size of the W2, which is fed back with a high frequency, is increasing. Consequently, feedback overhead is increasing. In particular, there exists a tradeoff between the feedback overhead and the feedback accuracy. Hence, the M value can be determined not to increase the feedback overhead too much while the feedback accuracy is appropriately maintained. Meanwhile, in the W2, $\alpha_j$, $\beta_j$ and $\gamma_j$ respectively indicate a prescribed phase value. In Formula 13, k, l and m are equal to 1 or greater than 1. M is equals to k, l, and m or greater than k, l and m. The k, l, and m are integers, respectively.

A code word structure satisfying Formula 13 uses a cross polarized antenna. The code word structure corresponds to a structure to which a correlation characteristic of a channel, which occurs when a space between antennas is dense (if a distance between neighboring antennas is less than half of a signal wavelength in general), is reflected. In case of the cross polarized antenna, the antenna can be classified into a horizontal antenna group and a vertical antenna group. Each of the antenna groups has a ULA (uniform linear array) antenna characteristic and two antenna group can co-locate. Hence, a correlation between antennas of two groups has an identical linear phase increment characteristic and a correlation between the antenna groups has a characteristic of phase rotation. Since a codebook corresponds to a quantized value of a channel, it is necessary to design a codebook in a manner of reflecting a characteristic of a channel corresponding to a source as it is. For clarity, an example of a rank 1 code word, which is made based on a structure of Formula 13, is shown in Formula 14 in the following and it is able to check that a channel characteristic has been reflected to a code word satisfying Formula 13.

$$W1(i) * W2(j) = \begin{bmatrix} X_i(k) \\ \alpha_j X_i(k) \end{bmatrix} \quad \text{[Formula 14]}$$

In the Formula 14, a code word is represented by a vector consisting ($N_t$ by 1) of $N_t$ (the number of transmitting (Tx) antenna) number of column and 1 row. The code word is structured by an upper vector $X_i(k)$ and a low vector $\alpha_j X_i(k)$ and each shows a correlation characteristic between the horizontal antenna group and the vertical antenna group. It may preferable that the $X_i(k)$ is represented as a vector including linear phase increment in a manner of reflecting the correlation characteristic between antennas of each antenna group. As a representative example, it may use a DFT (discrete Fourier transform) matrix.

Moreover, higher channel accuracy is required for the CoMP. In case of the CoMP JT, since many base stations cooperatively transmit identical data to a specific user equipment, it may theoretically consider it as a MIMO system where antennas are geographically distributed. In particular, similar to a single cell MU-MIMO, in case of performing MU-MIMO in JT, channel accuracy of a high level is required to avoid interference between co-scheduling user equipments. In case of CoMP CB, delicate channel information is also required to avoid interference interfering a serving cell by a neighboring cell.

1. 5. Carrier Aggregation Environment
1. 5. 1. The Generals of Carrier Aggregation Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure.

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an additional radio resource. PUCCH does not exist in the rest of cells (i.e., SCell) except PCell in the serving cell configured in the carrier aggregation environment.

After an initial security activation process is started, E-UTRAN can configure a network including one or more Scells in addition to a PCell which is configured in an early stage in a connection establishment process. In a carrier aggregation environment, the PCell and SCell can operate as component carriers, respectively. In the following embodiments, a primary component carrier (PCC) can be used as a meaning identical to the PCell and a secondary component carrier (SCC) can be used as a meaning identical to the SCell.

Figure 8:
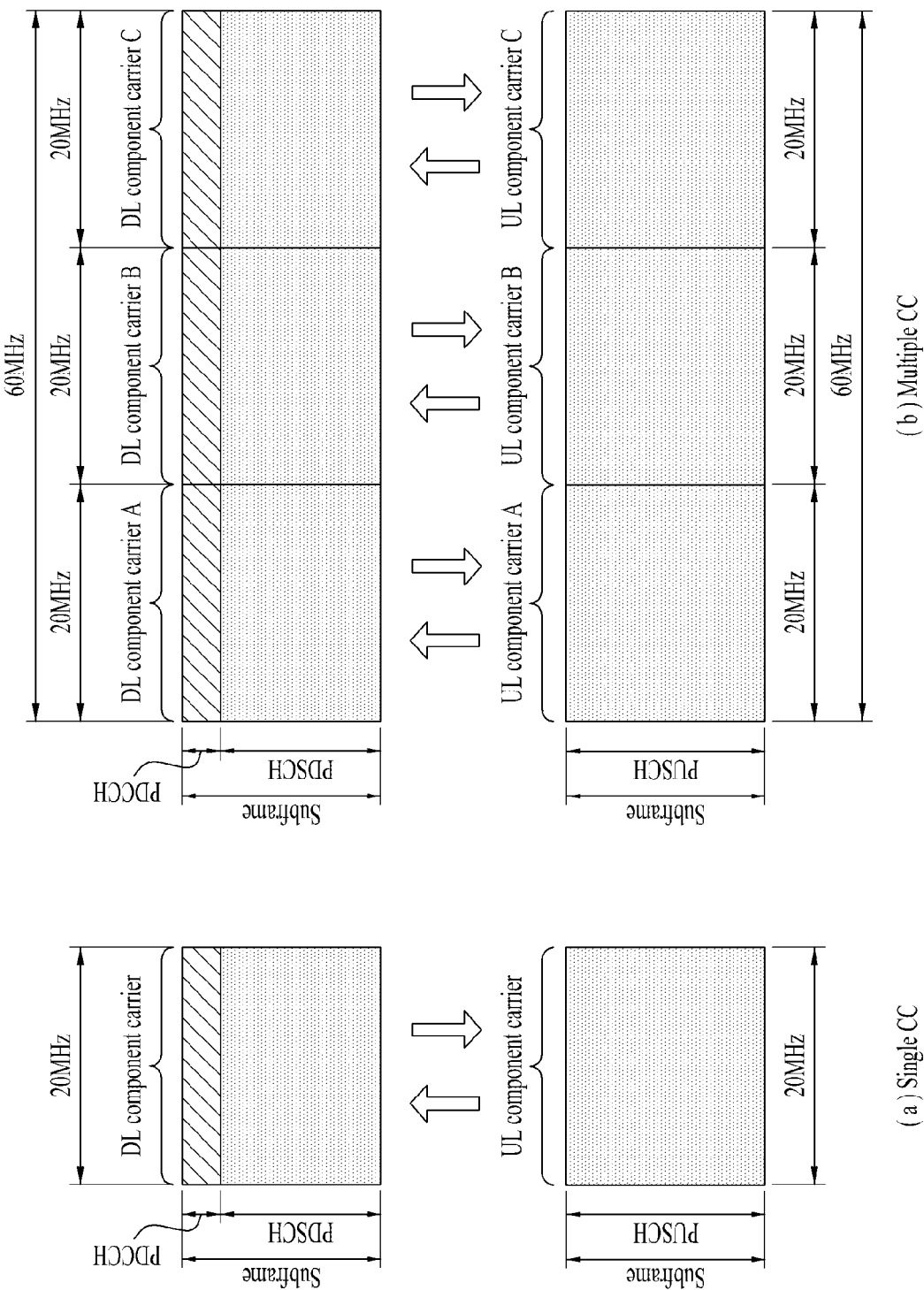
FIG. 8 is a diagram for one example of component carriers of LTE system and carrier aggregation used by LTE-A system.

FIG. 8 is a diagram for one example of component carriers of LTE system and carrier aggregation used by LTE-A system.

FIG. 8 (*a*) shows a single carrier structure used by LTE system. Component carriers include a DL CC and a UL CC. One component carrier may have a frequency range of 20 MHz.

FIG. 8 (B) shows a carrier aggregation structure used by LTE-A system. Referring to FIG. 8 (*b*), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

1. 5. 2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL CC set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 9:
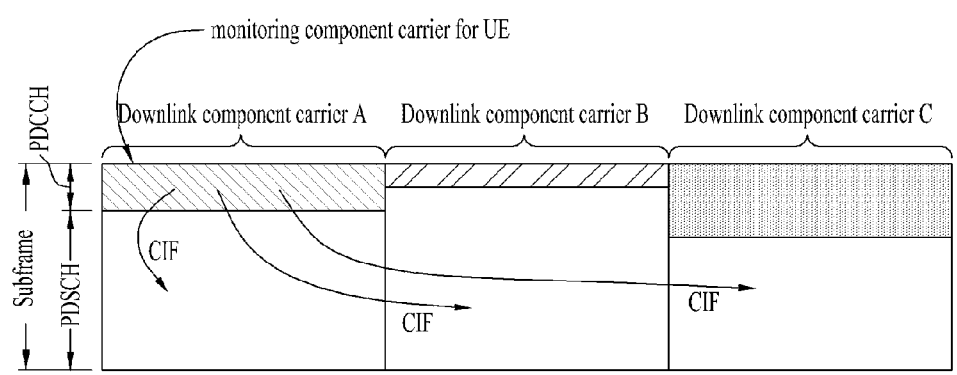
FIG. 9 is a diagram for a subframe structure of LTE-A system according to cross carrier scheduling.

FIG. 9 is a diagram for a subframe structure of LTE-A system in accordance with cross carrier scheduling.

Referring to FIG. 9, for a DL subframe for an LTE-A user equipment, 3 DL CCs are combined with each other and a DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In this case, a DL CC 'B' and a DL CC 'C', which are not set as the PDCCH monitoring DL CC, does not transmit PDCCH.

As mentioned in the foregoing description, a user equipment can receive a plurality of PDSCHs via a plurality of DL CCs. In this case, the user equipment may transmit ACK/NACK for each data in a single subframe on a single UL CC. If a plurality of ACK/NACKs are transmitted in a single subframe using a PUCCH format 1a/1b, high transmit power is required and PARR (peak-to-average power ratio) of UL transmission increases. Moreover, due to an inefficient use of a transmit power amplifier, transmission available distance between a user equipment and a base station may be reduced. In order to transmit a plurality of the ACK/NACKs via one PUCCH, ACK/NACK bundling or ACK/NACK multiplexing can be applied.

2. Method of Transceiving CSI (Channel State Information)

The present invention proposes a method of flexibly allocating an object of each CSI measurement in accordance with CoMP, a time domain ICIC (inter-cell interference coordination) situation, a carrier aggregation situation, or a situation in which a plurality of IMRs (interference measurement resources) are configured and the like according to a CSI measurement/calculation/report capability mounted on a user equipment.

In the present invention, the CSI measurement/calculation/report capability indicates the total number of CSI capable of being measured, calculated, or reported by the user equipment. In the following description, for clarity, this sort of capability of the user equipment is commonly called a 'CSI measurement capability'. The reason for restricting the total number of CSI measured by the user equipment to maximum N is because processing power of the user equipment can be restricted in the course of searching for an achievable modulation and coding scheme (MCS) and an appropriate precoding matrix index when the user equipment transmits in each CSI measurement object.

In case of the CoMP, the CSI measurement object may correspond to each participating cell or each transmission point (TP) (or, CSI-RS configuration for channel estimation of each cell or transmission point). In case of the time domain ICIC, the CSI measurement object may correspond to a set of subframes in which a neighboring cell causes a constant interference. In case of the carrier aggregation, the CSI measurement object may correspond to each component carrier. Or, the CSI measurement object may have a form of the IMR.

Specifically, the CSI measurement object can be configured in relation to a resource (hereinafter 'signal measurement resource') used for measuring an attribute of a signal capable of being used for calculating CSI and a resource (hereinafter 'interference measurement resource') used for measuring interference attribute capable of being used for calculating the CSI. In other word, a base station can configure one or more signal measurement resources and one or more interference measurement resources to a user equipment to calculate the CSI and the aforementioned CSI measurement object can be determined by a combination of one signal measurement resource and one interference measurement resource. For instance, the CSI measurement object can be determined in a manner that the signal measurement resources are divided according to each cell or each transmission point. In case of the time domain ICIC, the CSI measurement object can be determined in a manner that the interference measurement resources are divided according to a set of subframes. And, the CSI measurement object can be determined by a combination of a NZB CSI-RS resource and the IMR in a manner that the signal measurement resource is distinguished by a non-zero CSI-RS resource (NZP) and the interference measurement resource is distinguished by the IMR.

In this case, the total number of CSI measured by the user equipment can be restricted to the N in consideration of specific timing point. When the total number of CSI is restricted in consideration of the specific timing point, a meaning of restricting the number of measuring the CSI to the N on the specific timing point according to how timing is defined can be comprehended as to restrict the number of measuring the CSI capable of being measured on a single timing point (e.g., a single subframe) to N, to restrict the number of measuring the CSI capable of being reported on a single timing point (e.g., a single subframe) to N, or to restrict the number of objects, which are semi-statically configured as potential objects of the CSI measurement/report, to N.

As a different embodiment, the restriction on the total number of CSI measured by the user equipment may be performed in a manner that the sum of the number of CSIs measured/reported for a single CSI reference resource is restricted. Specifically, in reporting CSI on a specific timing point, a user equipment configures a previously existed specific subframe as a CSI reference resource and may be then able to measure the CSI in a manner of calculating a transmission rate which is achievable when PDSCH is transmitted in the corresponding CSI reference resource. In this case, after a subframe is designated as the CSI reference resource, the user equipment can start to measure/calculate a plurality of CSIs based on the designated CSI reference resource. CSI calculation complexity of the user equipment can be determined based on how many CSIs are calculated in one CSI reference resource. Hence, if a CSI measurement/report operation is regulated in a manner that the total number of CSIs, which are measured by the user equipment for a single CSI reference resource, is restricted, it may be effective since a production ratio of CSI, which corresponds to the CSIs processed in a subframe, can be restricted. Although a plurality of the CSIs are configured to be calculated in a single CSI reference resource, for instance, if an aperiodic CSI and a periodic CSI are configured to be reported on an identical timing, the periodic CSI is regulated not to be reported. In the same manner, if it is clear that a part of CSI among a plurality of the CSIs is not reported according to a predetermined rule, since the part of the CSI, which is not reported, does not influence on the calculation complexity of the user equipment, it may be excluded from the restriction of the total number of CSI measured by the user equipment.

Figure 10:
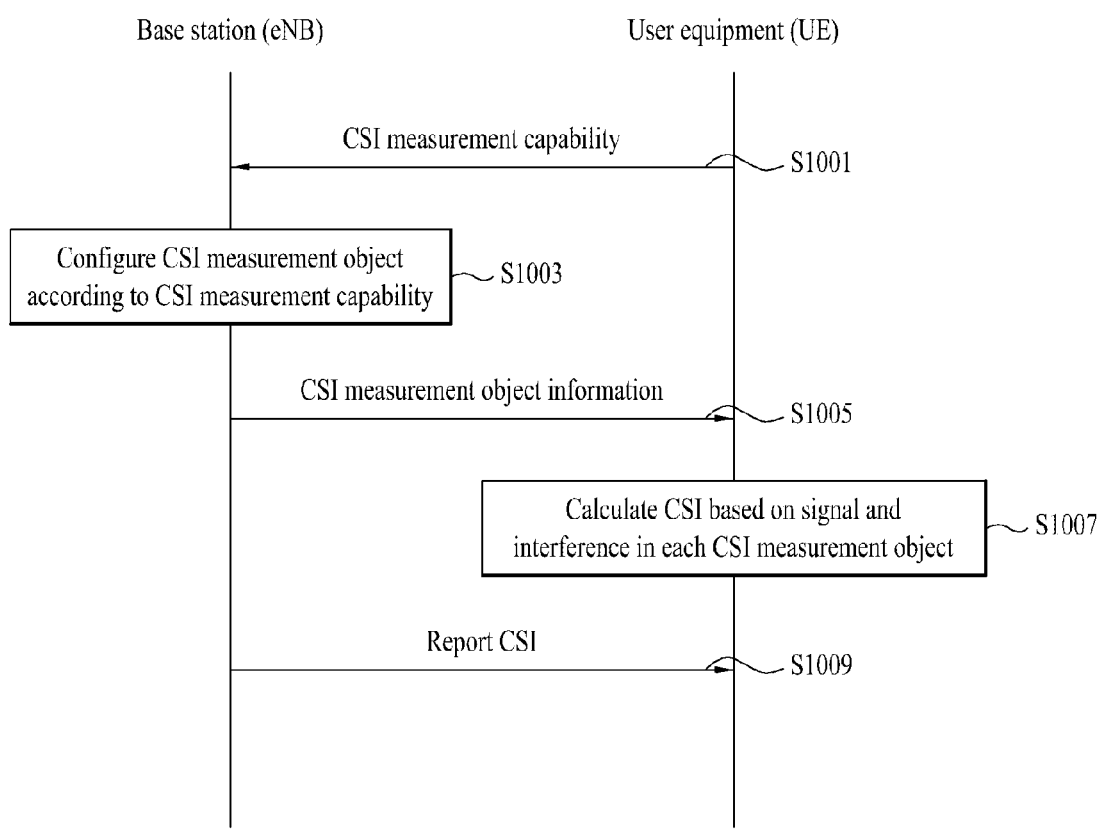
FIG. 10 is a flowchart for an example of a method of transceiving channel state information according to one embodiment of the present invention.

FIG. 10 is a flowchart for an example of a method of transceiving channel state information according to one embodiment of the present invention.

Referring to FIG. 10, a user equipment (UE) transmits a CSI measurement capability indicating the total number of CSIs capable of being measured, calculated or reported by the user equipment to an eNB [S1001]. In this case, the UE can transmit the CSI measurement capability to the eNB while exchanging capability of the UE with the eNB in such a process as an initial accessing a network and the like.

Having received the CSI measurement capability from the UE, the eNB configures a CSI measurement object to be measured and reported by the UE according to the CSI measurement capability of the UE [S1003]. In particular, the eNB restricts the total number of the CSI measurement objects set to the UE to be identical or less than the CSI measurement capability reported by the UE and configures each of the CSI measurement objects as many as the restricted total numbers. A method of configuring the CSI measurement object is explained in detail in 2.1. to 2.4. in the following.

In this case, in case of a user equipment capable of performing carrier aggregation, the eNB determines the total number of CSI, which is to be reported by the UE according to the CSI measurement capability of the UE, according to each component carrier (CC) activated to the UE. By doing so, the UE can be configured to report one or more CISs according to each of the activated component carriers. In other word, restriction on allocation of CSI measurement object and the total number of CSI measurement object can be regulated according to each component carrier (or frequency band). In particular, the UE regulates the total number of CSI capable of being measured according to each component carrier (or frequency band) as N (m) (in this case, m corresponds to an index of a component carrier or a frequency band) and the number of CSI capable of being measured on a component carrier m (or frequency band m) can be restricted to be equal to the N (m) or less than the N (m). Under this restriction, the eNB can appropriately distribute the total number of CSI measurement to each cell or a subframe set in accordance with the CoMP or the time domain ICIC situation within each component carrier (or frequency band).

Or, the eNB determines the total number of CSI, which is to be reported by the UE according to the CSI measurement capability of the UE, in a manner of restricting the total number of CSI to all of the component carriers activated to the UE. By doing so, the UE can be configured to report one or more CSIs among the activated all component carriers. In other word, the UE can be regulated to measure/report the total N number of CSIs without distinction of the component carrier and the frequency band. In this case, the number of CSI capable of being configured to the UE can be represented as n (k, i). The sum of the n (k, i) for k and i should equal to N or less than N. In this case, the n (k, i) indicates the number of CSI configured for an $i^{th}$ component carrier which is configured in a $k^{th}$ cell (or eNB). In this case, since the eNB can borrow CSI measurement capability defined for a specific component carrier to perform CSI measurement/report for CoMP or interference coordination on a different component carrier, more flexible CSI measurement object allocation can be performed.

The eNB transmits information on a CSI measurement object set to the UE to the UE [S1005]. In this case, as mentioned in the foregoing description, since the number of the CSI measurement object may be identical or less than the CSI measurement capability reported by the UE, the eNB can transmit the information on the CSI measurement object as many as the number of CSI set to the UE. In particular, if the CSI measurement capability of the UE corresponds to 3, the eNB can transmit the information on 3 configured CSI measurement objects to the UE. Or, the eNB may transmit the information on 1 or 2 configured CSI measurement objects to the UE only.

The information on the CSI measurement object can be transmitted to the UE via a physical layer channel (e.g., PDCCH) or an upper layer signal (e.g., RRC (radio resource control) signaling). In case of an aperiodic CSI report, the eNB can transmit the information on the CSI measurement object to the UE on timing that the CSI report is triggered.

As mentioned in the foregoing description, the CSI measurement object can be determined by a combination of one signal measurement resource and one interference measurement resource. In this case, the eNB can transmit information on the signal measurement resource and information on the interference measurement resource to the UE according to each CSI measurement object in a manner of transmitting the information on the CSI measurement object. In particular, the information on the CSI measurement object can indicate the signal measurement resource and the interference measurement resource belonging to the CSI measurement object.

And, after transmitting information (hereinafter 'signal measurement set information') on a set of the signal measurement resources and information (hereinafter 'interference measurement set information') on a set of the interference measurement resources to the UE, the eNB may transmit information indicating a combination relation in the set of the signal measurement resources and the set of the interference measurement resources to the UE only as the information on the CSI measurement object. In particular, the information on the CSI measurement object can indicate the combination in the signal measurement set and the interference measurement set. For instance, after configuring a set of 3 signal measurement resources (a signal measurement resource 1, a signal measurement resource 2 and a signal measurement resource 3) as the signal measurement set and a set of 3 interference measurement resources (an interference measurement resource 1, an interference measurement resource 2 and an interference measurement resource 3) as the interference measurement set in the UE in advance, the eNB can inform the UE which combination corresponds to the CSI measurement object in each of the measurement sets. In this case, the signal measurement set information and the interference measurement set information can be transmitted to the UE via an upper layer signaling or the UE may know the signal measurement set information and the interference measurement set information in advance. In this case, if the signal measurement set information and the interference measurement set information are transmitted to the UE via the upper layer signaling, the corresponding operation may be performed before the step S1005.

Having received the information on the CSI measurement object, the UE measures a signal via a reference signal (e.g., CRS, CSI-RS and the like) which is transmitted in a signal measurement resource belonging to the CSI measurement object, measures interference in an interference measurement resource belonging to the CSI measurement object and calculates CSI based on the measured signal value and the measured interference value [S1007]. Subsequently, the UE transmits the calculated CSI to the eNB via a physical layer channel (e.g., PUSCH or PUCCH) [S1009].

Meanwhile, the UE can periodically or aperiodically report the CSI to the eNB. The aforementioned restriction on the total number of CSI, which is measured, calculated, and reported by the UE, can be used for both the periodic CSI report and the aperiodic CSI report.

In this case, the restriction on the total number of CSI can be identically performed irrespective of the periodic CSI report and the aperiodic CSI report. In other word, the number of CSI measurement object, which is configured to measure/report maximum CSI by the UE via the periodic CSI report, and the number of CSI measurement object, which is configured to measure/report maximum CSI by the UE via the aperiodic CSI report, can be identically configured.

Or, a separate CSI measurement object can be added to the periodic CSI report and the aperiodic CSI report. According to the periodic CSI report, when a CSI is calculated and which CSI is calculated/reported are determined in advance via such an upper layer signal as an RRC. Hence, the UE knows when the CSI is reported and which CSI is reported in advance. Hence, the UE performs CSI measurement and calculation in advance to distribute overhead for the CSI measurement. On the contrary, according to the aperiodic CSI report, the UE is indicated to measure/report a CSI on timing that the CSI report is triggered. Hence, it is difficult for the UE to measure/prepare for the CSI in advance. Hence, measuring/calculating the periodic CSI and measuring/calculating the aperiodic CSI can be appropriately divided by proper implementation of the UE (as an example, in case that a periodic CSI is not triggered, the periodic CSI to be reported in the future can be calculated in advance). In this case, the sum of the number of CSI measured/reported by the UE can be determined independence of the periodic CSI and the aperiodic CSI. As an example, when the UE is regulated to measure/report maximum 4 CSIs via the periodic CSI report and the UE is regulated to measure/report maximum 2 CSIs via the aperiodic CSI report at the same time, although the number of CSIs capable of being reported via a single CSI report corresponds to 4 in case of the periodic report and corresponds to 2 in case of the aperiodic report, if the periodic report and the aperiodic report are used in a manner of being appropriately mixed, a network can obtain maximum 6 CSIs. And, as mentioned in the foregoing description, since the measurement/calculation of the periodic CSI may not considerably influence on the complexity of the UE, restriction on the total number of the periodic CSI measured/reported by the UE may not occur. In particular, in case of the aperiodic CSI where a CSI should be calculated and reported within a prescribed time after a triggering message is received, the restriction on the total number of the CSI measured and reported by the UE may occur.

Moreover, as mentioned in the foregoing description, the restriction on the number of the CSI measurement object according to the CSI measurement capability of the UE can be selectively applied to a specific feedback mode only. Compared to a wideband CSI feedback, which calculates and reports PMI or CQI to be used over a total band in frequency domain, since a subband CSI feedback, which differently calculates and reports the PMI or the CQI to be used in a manner of dividing the total frequency band into a plurality of sub bands and to be used in a subband unit, needs more complex CSI measurement/calculation/report process, the restriction on the CSI measurement object according to the CSI measurement capability of an individual UE can be limitedly applied to the subband CSI feedback only.

2. 1. Embodiment 1— time domain ICIC

In case that a plurality of the CSI measurement objects are configured in accordance with the CSI measurement capability of the UE, the CSI measurement objects can be configured in a manner that an interference measurement resource is distinguished in consideration of a time domain ICIC operation of a neighboring cell in a subframe dimension as shown in the following.

FIG. 11 is a diagram for an example of a measurement object of channel state information according to one embodiment of the present invention. Boxes depicted on the top of FIG. 11 show a macro eNB and a pico eNb, respectively. A number in each of the boxes indicates an index of each subframe constructing a corresponding radio frame.

Referring to FIG. 11, a UE is located between (boundary) the macro eNB and the pico eNB and the pico eNB is configured as a serving cell (eNB). The macro eNB, which has downlink transmit power stronger than the downlink transmit power of the pico eNB, can perform a silencing in subframes of even number for time domain interference coordination with the pico eNB (or, the macro eNB can configure the subframes of even number as ABS (almost blank subframe)). In this case, the silencing means to configure the transmit power of a specific physical channel or a signal to be low in a corresponding subframe to prevent strong interference of the eNB from interfering a cell of a neighboring eNB. And, in this case, the silencing may include a case that the transmit power of the corresponding channel or the signal is configured by 0.

It is necessary for a UE to feedback a CSI when the pico eNB corresponding to an eNB of a serving cell transmits data on PDSCH. In this case, since the extent of interfering the transmission of the pico eNB interfered by the macro eNB varies according to the silencing operation (or ABS configuration) of the macro eNB, it is preferable to measure/report CSI on the pico eNB according to a subframe. In this case, the pico eNB can configure the UE to calculate the CSI in a manner of dividing subframe sets into a subframe set (subframe set 1) in which a relatively weak interference is received from the macro eNB due to the silencing operation (or ABS configuration) of the macro eNB and a subframe set (subframe set 2) in which a relatively strong interference is received from the macro eNB since the silencing operation (or ABS configuration) is not performed by the macro eNB. In particular, the pico eNB can configure the CSI measurement object of the UE in a manner of dividing the CSI measurement object into two subframe sets in consideration of the interference received from a neighboring cell within the CSI measurement capability of the UE. For instance, while a signal measurement resource of the CSI measurement object is identically maintained by a resource (①) to which a reference signal of the pico eNB is transmitted, an interference measurement resource of the CSI measurement object can be divided into a subframe set (i) of the pico eNB in which the silencing (or ABS) operation of the macro eNB is performed and a subframe set (ii) in which the silencing operation is not performed. And, the CSI measurement object can be determined by combinations (①-i, ①-ii) of the signal measurement resource and each of the interference measurement resources.

By doing so, the UE calculates a CSI 1 for the subframe set 1 (the subframes of even number in FIG. 11) consisting of the subframes in which the silencing operation (or ABS) of the macro eNB is performed and calculates a separate CSI 2 for the subframe set 2 consisting of non-silencing (or non-ABS) subframes (subframes of odd number in FIG. 11) to which the macro eNB transmits PDSCH in general. The UE can report each of the calculated CSIs to the eNB.

2. 2. Embodiment 2— CoMP

In case that a plurality of CSI measurement objects are configured according to the CSI measurement capability of the UE, a plurality of the CSI measurement objects can be configured in a manner that signal measurement resources capable of being used for a CSI calculation are distinguished from each other in a cell dimension. And, interference measurement resources can be configured in a manner of being distinguished from each other in a subframe dimension in consideration of a time domain ICIC operation of a neighboring cell.

If a UE is capable of performing a CoMP operation, it is preferable for the UE to measure/report a CSI for a subframe transmitted by the macro eNB as mentioned earlier in the embodiment according to FIG. 11. This is because it is helpful for the macro eNB to transmit PDSCH to the UE by dynamic cell selection, which is one of the CoMP operations, in accordance with an instantaneous channel situation or a load situation.

Figure 12:
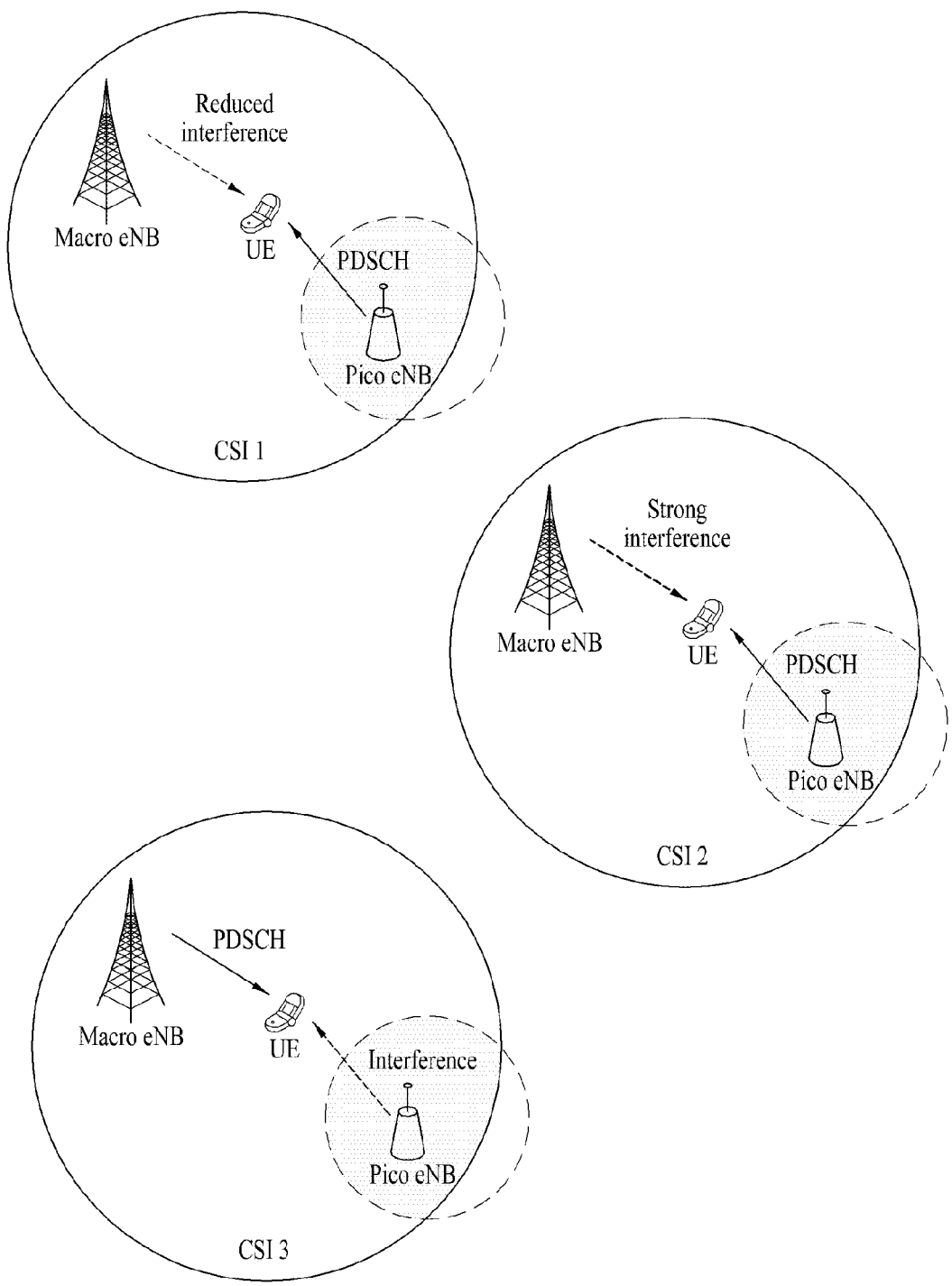

FIG. 12 is a diagram for an example of a measurement object of channel state information according to one embodiment of the present invention.

Referring to FIG. 12, the pico eNB can configure the UE to calculate the CSI in a manner of dividing subframe sets into a subframe set (subframe set 1) in which a relatively weak interference is received from the macro eNB due to the silencing operation (or ABS configuration) of the macro eNB, a subframe set (subframe set 2) in which a relatively strong interference is received from the macro eNB since the silencing operation (or ABS configuration) is not performed by the macro eNB and a subframe transmitted by the macro eNB. In particular, the pico eNB can configure the CSI measurement object of the UE in a manner of dividing the CSI measurement objects into two subframe sets in consideration of the interference received from a neighboring cell within the CSI measurement capability of the UE and adding a cell becoming an object of a signal measurement usable for CSI calculation to the CSI measurement objects. For instance, signal measurement resources of the CSI measurement objects are divided into a resource (①) to which a reference signal of the pico eNB is transmitted and a resource (②) to which a reference signal of the macro eNB is transmitted. Interference measurement resources of the CSI measurement objects can be divided into a subframe set (i) of the pico eNB in which the silencing (or ABS configuration) operation of the macro eNB is performed, a subframe set (ii) in which the silencing operation is not performed and the subframe (iii) of the macro eNB. And, the CSI measurement object can be determined by combinations (①-i, ①-ii and ②-iii) of the signal measurement resource and each of the interference measurement resources.

By doing so, the UE calculates a CSI 1 for the subframe set 1 of the pico eNB consisting of the subframes in which the silencing operation (or ABS) of the macro eNB is performed, calculates a separate CSI 2 for the subframe set 2 of the pico eNB consisting of non-silencing (or non-ABS) subframes to which the macro eNB transmits PDSCH in general and calculates a CSI 3 for the subframe transmitted by the macro eNB. The UE can report each of the calculated CSIs to the eNB.

As mentioned in the foregoing description, the UE capable of measuring/calculating/reporting N number of CSIs can appropriately adjust the measurement object of each of the CSIs. Specifically, if the UE is configured to measure CSIs for K number of cells (or transmission point (TP)), the UE can report a CSI for a $k^{th}$ cell ($1 \leq k \leq K$) in a manner of dividing the CSI into n(k) numbers. In this case, the total number of CSIs configured to the UE becomes $n(1)+n(2)+ \ldots +n(k)$ and this value should be equal to or less than the N. Referring to FIG. 12, if a cell of the pico eNB and a cell of the macro eNB correspond to a first cell (k=1) and a second cell (k=2), respectively, it shows a case that $n(1)=2$ and $n(2)=1$.

Meanwhile, if the UE encounters a different situation due to such a reason as movement of the UE or the like, a network can adjust the CSI measurement object again within the CSI measurement capability of the UE (i.e., the total number of CSI measurement/calculation/report is restricted less than the N).

Figure 13:
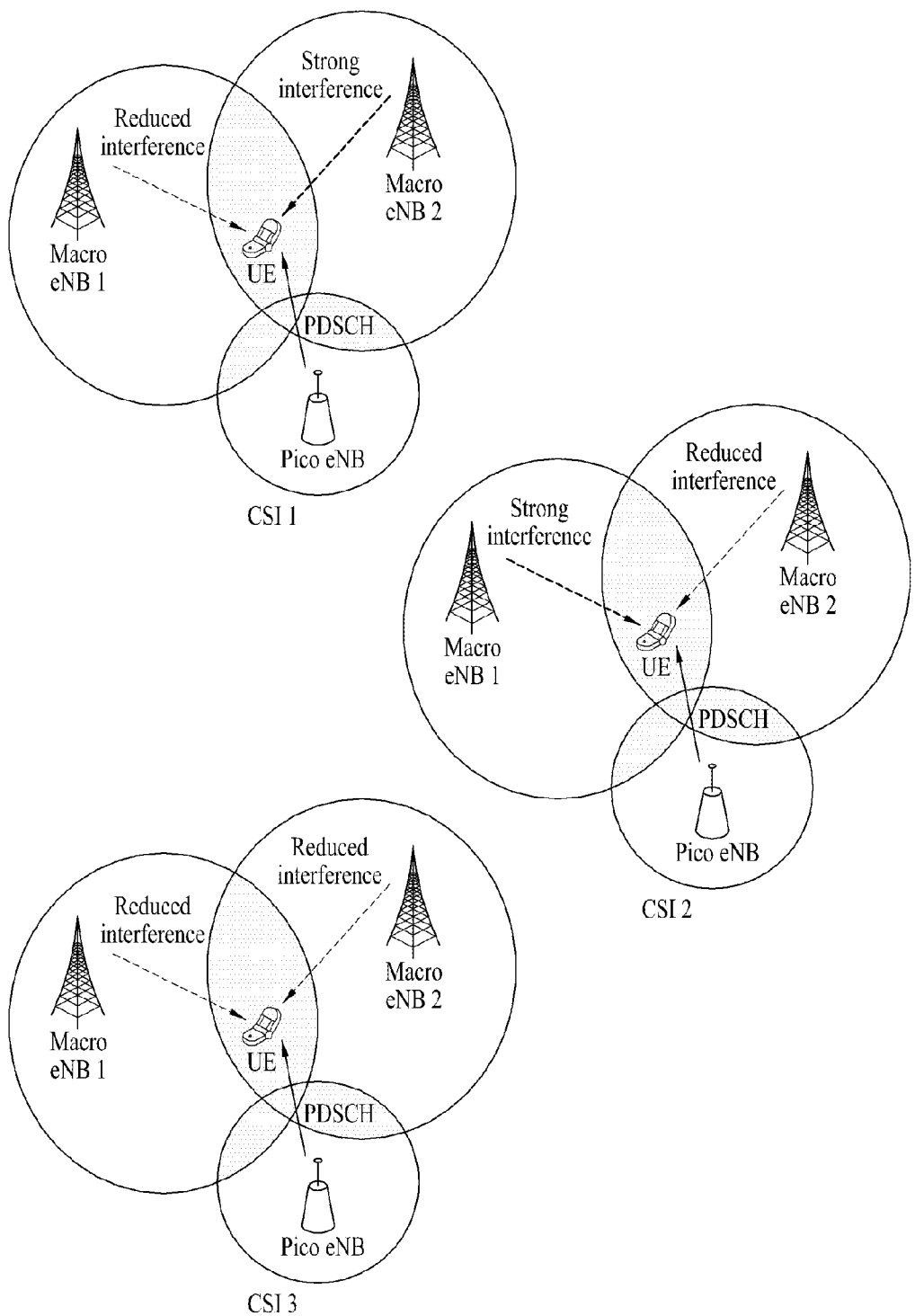

FIG. 13 is a diagram for an example of a measurement object of channel state information according to one embodiment of the present invention.

Referring to FIG. 13, if a UE moves to a situation that the UE is interfered by a macro eNB 1 and a macro eNB 2 at the same time and the two macro eNB use silencing patterns (or ABS patterns) different from each other, CSI measurement objects of the UE are restricted by one pico cell (pico eNB) in a cell dimension and can be applied in a manner of being divided into 3 subframe sets in a subframe dimension. In this case, each of the subframe sets can be designated in a manner that the subframe sets are classified into a subframe set 1 in which a macro eNB 1 performs a silencing operation (or ABS configuration) only, a subframe set 2 in which a macro eNB 2 performs the silencing operation (or ABS configuration) only and a subframe set 3 in which the macro eNB 1 and the macro eNB 2 simultaneously perform the silencing operation (or ABS configuration). For instance, while a signal measurement resource of the CSI measurement object is identically maintained by a resource (①) to which a reference signal of the pico eNB is transmitted, interference measurement resources can be classified into the subframe set 1 (i) in which the macro eNB 1 performs the silencing operation (or ABS configuration) only, the subframe set 2 (ii) in which the macro eNB 2 performs the silencing operation (or ABS configuration) only and the subframe set 3 (iii) in which the macro eNB 1 and the macro eNB 2 simultaneously perform the silencing operation (or ABS configuration). And, the CSI measurement object can be determined by combinations (①-i, ①-ii and ①-iii) of the signal measurement resource and each of the interference measurement resources.

In this case, a cell of the pico eNB is designated as a first cell. It is able to see that K corresponds to 1 and n(1)=3.

Figure 14:
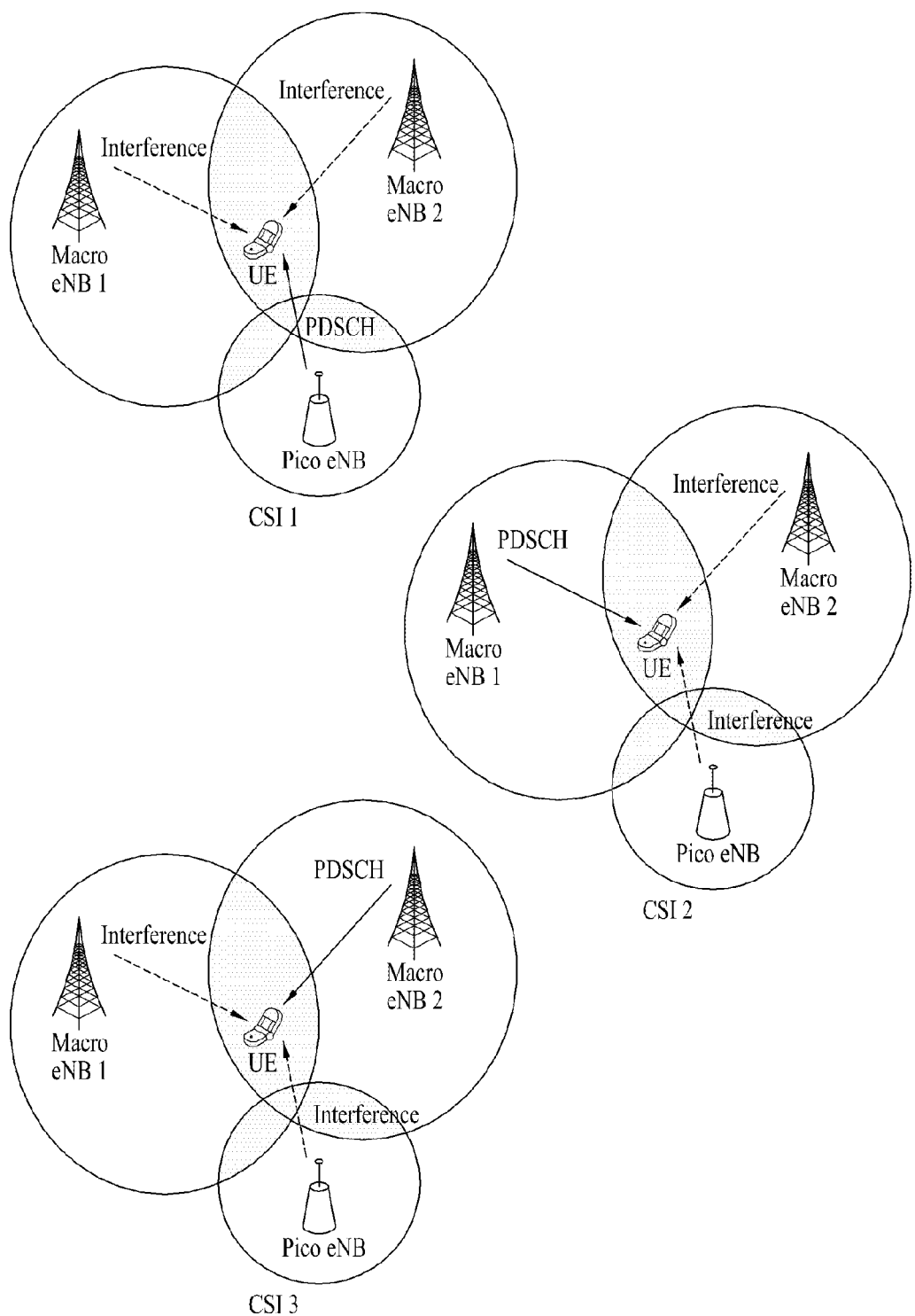

FIG. 14 is a diagram for an example of a measurement object of channel state information according to one embodiment of the present invention.

Referring to FIG. 14, a case that the CSI measurement/calculation/report capability of the UE shown in FIG. 13 is distributed to each cell one by one to concentrate on a CoMP operation is depicted.

The pico eNB can configure the UE to calculate CSIs in a manner of dividing into the CSIs into a CIS for a subframe transmitted by the pico eNB, a CIS for a subframe transmitted by a macro eNB 1 and a CIS for a subframe transmitted by a macro eNB 2. In particular, the pico eNB can configure CSI measurement objects in a manner of dividing the CSI measurement objects according to a cell becoming a signal measurement object usable for the CSI calculation within the CSI measurement capability of the UE. For instance, signal measurement resources of the CSI measurement object are classified into a resource (①) to which a reference signal of the pico eNB is transmitted, a resource (②) to which a reference signal of the macro eNB 1 is transmitted and a resource (③) to which a reference signal of the macro eNB 2 is transmitted and interference measurement resources can be classified into a subframe (i) of the pico eNB, a subframe (ii) of the macro eNB 1 and a subframe (iii) of the macro eNB 2. And, the CSI measurement object can be determined by combinations (①-①, ②-ii and ③-iii) of the signal measurement resource and each of the interference measurement resources.

In this case, a cell of the pico eNB, a cell of the macro eNB 1 and a cell of the macro eNB 2 are designated as a first cell, a second cell and a third cell, respectively and it corresponds to a case that n(1), n(2) and n(3) are configured by 1.

When a UE calculates each CSI, since the extent of interference from a neighboring cell varies according to an operation configured to be performed by the neighboring cell in a corresponding interference measurement resource, a network can configure each CSI to be calculated according to a preferred interference situation.

Meanwhile, when the UE performs a CoMP operation in a manner of being located between two eNBs, in order for the UE to dynamically select DCS (dynamic cell selection) and JT (joint transmission), a part of CSI measurement capability of the UE can be used to calculate and report an inter-cell CSI (or inter-CSI-RS CSI in case that each cell or a transmission point configures a CSI-RS). In particular, an eNB can configure a part of all CSI measurement objects allocated to the UE to measure/report the inter-cell CSI (or inter-CSI-RS CSI).

Figure 15:
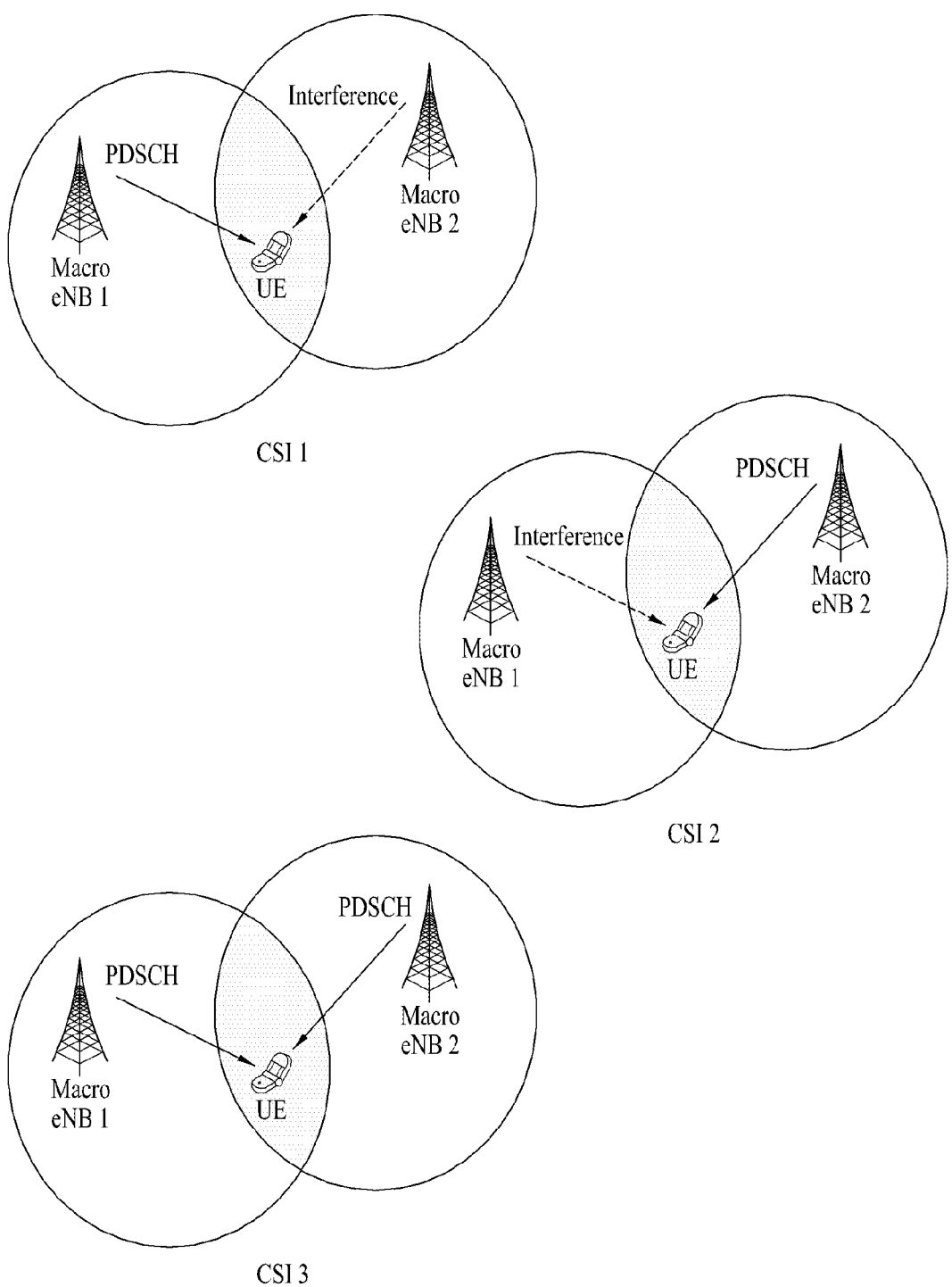

FIG. 15 is a diagram for an example of a measurement object of channel state information according to one embodiment of the present invention.

Referring to FIG. 15, first of all, the UE is configured to report CSIs (CSI 1 and CSI 2) on each of two eNBs (macro eNB 1 and macro eNB 2) and is configured to additionally transmit a CSI 3. The CSI 3 can be configured as an inter-cell CSI which is appropriate for the joint processing. In this case, the inter-cell CSI may correspond to a CSI which is induced under an assumption that the joint transmission is performed in a plurality of cells. For instance, CQI of the CSI 3 may correspond to CQI which is induced under an assumption that an eNB corresponding to the CSI 1 and the CSI 2 simultaneously transmits PDSCH using PMI reported by the CSI 1 and the CSI 2. In this case, it is preferable that the PMI of the CSI 3 corresponds to information on correlation between antennas of two cells. Specifically, the PMI of the CSI 3 can be configured as follows.

1) The PMI of the CSI 3 can be configured by a phase/amplitude difference between a reference antenna port (e.g., first antenna port) of the PMI reported for the CSI 1 and a reference antenna port of the PMI reported for the CSI 2. The phase/amplitude difference can be induced from a part of antenna ports of CSI-RS (or CRS) which is used to calculate the PMI of the CSI 1 and the PMI of the CSI 2. Or, configuration of a third CSI-RS (or CRS), which corresponds to a combination of a part of antenna ports of the CSI-RS (or CRS) used by an eNB to calculate the PMI of the CSI 1 and the PMI of the CSI 2, is configured and the PMI is selected from the third CSI-RS configuration to measure/report the phase/amplitude difference.

2) The PMI of the CSI 3 uses the PMI which is reported in the CSI 1 on the eNB 1 among two eNBs. A weighted value capable of providing maximum transfer rate when the two eNBs transmit PDSCH together can be configured in a manner of multiplying the PMI, which is reported in the CSI 2 on the eNB 2, by a prescribed weighting factor.

3) The PMI of the CSI 3 is induced from the third CSI-RS. The third CSI-RS can be configured to be a single CSI-RS configuration in which both the eNB 1 and the eNB 2 are participating in transmitting. As an example, a part of the antenna ports of the third CSI-RS can be used by the eNB 1 and the remaining of the antenna port of the third CSI-RS can be used by the eNB 2 for the purpose of transmitting.

A report of the PMI may not be configured in the CSI 3. This indicates that the CSI 3 is utilized for reporting CQI on joint transmission from the two eNBs only.

As mentioned in the foregoing description, in case that the CSI 3 corresponds to the inter-cell CSI, there may exist a restriction on various CSI feedback parameters. As an example, in order to select a smooth CoMP joint transmission PMI, RI of the CSI 1 may be configured to be identical to RI of the CSI 2. Or, it may configure sub band selections to be identical to each other. And, in case of the typically aforementioned 1) and 2), a rank of the CSI 3 may be meaningless. This is because PMI corresponding to the rank of the CSI 3 is reporting a phase/amplitude difference between two PMIs only. In this case, the rank of the CSI 3 can be configured to be fixed by such a specific value as 1 or can be configured not to be reported. And, if the rank of the CSI 3 collides with a different uplink signal, a lowest priority can be given to the rank of the CSI 3 to drop the rank of the CSI 3 from the top priority transmission.

2. 3. Embodiment 3— Configuration of a Plurality of IMRs

In case that a plurality of CSI measurement objects are configured in accordance with CSI measurement capability of a UE, a plurality of the CSI measurement objects can be configured in a manner that interference measurement resources capable of being used for calculating CSI are divided according to a plurality of the IMRs as described in the following.

CSI on a single cell (or transmission point) may become one or more according to the number of interference values utilized for the calculation of the CSI. The measurement of a plurality of the interference values can also be implemented by a form of configuring a plurality of interference measurement resources (IMRs) configured by a network. In this case, the IMRs indicate a set (it may limitedly exist for a specific subframe set only) of resource elements (REs) designated by an eNB to measure an attribute of interference, which is to be used to calculate a specific CSI. In particular, the eNB can indicate to designate a set of a series of resource elements as the IMRs in advance via such an upper layer signal as an RRC, calculate the specific CSI based on the interference measured in the IMRs and appropriately report the specific CSI. In this case, it is preferable to configure the resource elements belonging to one IMR configuration to be laid on an identical interference situation to combine values measured in each of the resource elements with each other. In this case, the identical interference situation means to configure transmission points, which provide valid interference to a corresponding UE, to have an identical (or, although there is a little change, since a span of the change is limitative, a considerable error may not occur in measuring CSI despite the change is considered as an identical configuration) precoding and power allocation and the like in a corresponding resource element.

In order to enable a single UE to calculate CSI in interference situations different from each other, one or more IMRs can be configured to the single UE. An individual IMR can be configured by a form identical to a form of a resource occupied by a CSI-RS to estimate a channel. In addition, an individual IMR may have a form of a zero power CSI-RS (ZP CSI-RS) which is typically used to protect a CSI-RS of a neighboring transmission point. In other word, the IMR can be configured by a whole or a subset of ZP CSI-RS resources.

One or more NZP CSI-RS resources used for measuring channel attribute of CSI can be configured to a UE. In case that one or more NZP CSI-RS resources and one or more IMRs are set to the UE, an eNB can configure a CSI measurement object by a combination of one NZP CSI-RS resource used for measuring the channel attribute of the CSI and one IMR. For instance, in case that 3 NZP CSI-RS resources and 3 IMRs are set to the UE, total 9 combinations can be calculated. The eNB sets a specific combination to the UE as the CSI measurement object according to CSI measurement performance of the UE among the total calculated combinations and may be able to inform the UE of information on each of the combinations belonging to the CSI measurement object. By doing so, the UE calculates each CSI based on a signal and an interference measurement value for each combination belonging to the CSI measurement object and reports each of the calculated CSIs to the eNB.

Figure 16:
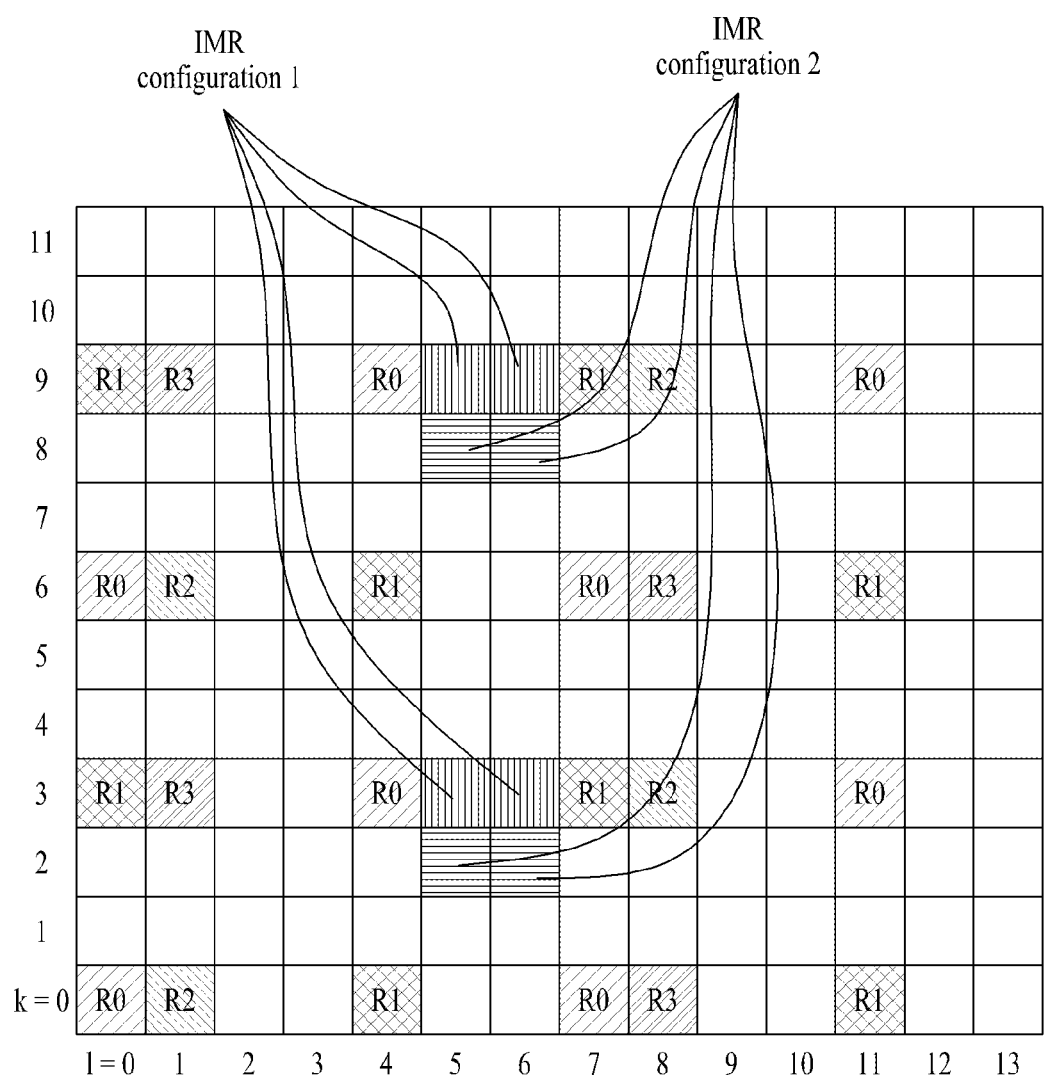

FIG. 16 is a diagram for an example of a measurement object of channel state information according to one embodiment of the present invention.

In FIG. 16, resource elements (REs) represented as 'R0', 'R1', 'R2' and 'R3' indicate positions of CRSs for an antenna port index 0, 1, 2 and 3, respectively.

FIG. 16 shows an example of a ZP CSI-RS form that two IMRs (IMR configuration 1 and IMR configuration 2) have 4 antenna ports in a specific subframe.

A UE can measure an interference attribute for calculating CSI in each IMR. In this case, interference attributes different from each other can be measured in each IMR according to an operation of a neighboring eNB. For instance, in case that the neighboring eNB mutes in an IMR configuration 1 and transmits data in an IMR configuration 2, the UE can measure CSI 1 with no (small) interference in the IMR configuration 1 and CSI 2 with (lots of) interference in the IMR configuration 2 in a single subframe at the same time or vice versa.

As mentioned in the foregoing description, in case that a plurality of CSIs are calculated for a single cell (or transmission point) based on a plurality of IMR configurations, the eNB can restrict the total number of CSIs calculated and reported by the UE.

For instance, while a signal measurement resource of a CSI measurement object is identically maintained by a resource (①) to which a reference signal of the eNB is transmitted, interference measurement resources of the CSI measurement object can be classified into a resource element (i) belonging to the IMR configuration 1 and a resource element (ii) belonging to the IMR configuration 2. And, the CSI measurement object can be determined by combinations (①-i and ①-ii) of the signal measurement resource and each of the interference measurement resources.

And, as mentioned in the foregoing description, since one or more NZP CSI-RE resources used for measuring the channel attribute of the CSI can be configured, in case that the signal measurement resources of the CSI measurement object are classified into a NZP CSI-RS resource 1 (①) and a NZP CSI-RS resource 2 and the interference measurement resources of the CSI measurement object are classified into the resource element (i) belonging to the IMR configuration 1 and the resource element (ii) belonging to the IMR configuration 2, the CSI measurement object can be variously determined according to the combinations (①-i, ①-ii/①-i, ②-ii/①-ii, ② -i/②-i, ②-ii) of the signal measurement resources and the interference measurement resources.

For instance, referring back to FIG. 12, the CSI 1 and the CSI 2 may respectively indicate cases that the signal measurement resource of the CSI measurement object is configured by a NZP CSI-RS resource (identical or different NZP CSI-RS resource) of the pico eNB and the interference measurement resource of the CSI measurement object is configured by the IMR 1 configured to perform an operation of reducing transmit power and the IMR 2 configured to perform an operation of not reducing the transmit power by the macro eNB. And, the CSI 3 may indicate a case that the signal measurement resource of the CSI measurement object is configured by the NZP CSI-RS resource of the macro eNB and the interference measurement resource of the CSI measurement object is configured by the IMR 3 capable of measuring interference of the pico eNB.

And, referring back to FIG. 13, the CSI 1, the CSI 2 and the CSI 3 may indicate cases that the signal measurement resource of the CSI measurement object is configured by the NZP CSI-RS resource (identical or different NZP CSI-RS resource) of the pico eNB and the interference measurement resource of the CSI measurement object is configured by the IMR 1 configured to perform the operation of reducing the transmit power by the macro eNB 1 only, the IMR 2 configured to perform the operation of reducing the transmit power by the macro eNB 2 only and the IMR 3 configured to perform the operation of reducing the transmit power by both the macro eNB 1 and the macro eNB 2.

And, referring back to FIG. 14, the CSI 1, the CSI 2 and the CSI 3 may indicate cases that the signal measurement resource of the CSI measurement object is configured by the NZP CSI-RS resource of the pico eNB, the NZP CSI-RS resource of the macro eNB 1 and the NZP CSI-RS resource of the macro eNB 2 and the interference measurement resource of the CSI measurement object is configured by the IMR 1 capable of measuring the interference of the macro eNB 1 and the interference of the macro eNB 2, the IMR 2 capable of measuring the interference of the macro eNB 2 and the interference of the pico eNB and the IMR 3 capable of measuring the interference of the macro eNB 1 and the interference of the pico eNB.

2. 4. Embodiment 4

In the foregoing description 2. 1 to 2. 3., examples that the CSI measurement capability of the UE is represented by the number of CSI measurement object have been described, by which the principle of the present invention may be non-limited. The principle of the present invention may be applied to a general situation that the CSI measurement capability of the UE includes a different form. And, the CSI measurement capability of the UE can be applied in a manner of being combined with a different form together with the number of the CSI measurement object.

1) The CSI measurement capability of the UE can be implemented by such a form as a CRS or a CSI-RS enabling the UE to measure/calculate/report CSI at the same time. In other word, in case that ap (m) number of antenna ports of the CSI measurement object m are given, a function f (ap (m)) is defined and the sum of the defined function can be restricted to be equal to or less than a prescribed number. For instance, if the UE is able to perform CSI measurement/calculation/report for total 16 antennas, the CSI measurement/calculation/report can be configured to perform 4 CSI measurement objects including 4 antenna ports. Or, the CSI measurement/calculation/report can be configured to perform 2 CSI measurement objects including 8 antenna ports.

2) The CSI measurement capability of the UE can be implemented by such a form as the sum of the number of code word in a codebook becoming a candidate for selecting an optimal precoding matrix of each CSI measurement object. In other word, in case that a codebook size of a CSI measurement object m is given by cb (m), a function f (cb (m)) is defined and the sum of the defined function can be restricted to be equal to or less than a prescribed number. In particular, the sum of the defined function can be restricted to be equal to or less than the number according to the CSI measurement capability of the UE. For instance, if the UE is able to perform CSI measurement/calculation/report for total 100 code words, the CSI measurement/calculation/report can be configured to perform 5 CSI measurement objects including 20 code words. Or, the CSI measurement/calculation/report can be configured to perform 2 CSI measurement objects including 50 code words.

Various embodiments of a method of setting a CSI measurement object to a UE according to CSI measurement capability have been explained in the 2. 1. to 2. 4. in the foregoing description. Among the embodiments explained in the 2. 1. to 2. 4., one embodiment can be independently used or one or more embodiments can be used in a manner of being combined with each other.

For instance, in case that a plurality of IMRs are configured while a time domain ICIC operation is performed, the CSI measurement objects are classified into a subframe set in which a silencing operation of the macro eNB is performed and a subframe set in which the silencing operation of the macro eNB is not performed and then CSI is measured and reported in each of the subframe sets. And, a plurality of CSI measurement objects can be configured by a combination of an NZP CSI-RS resource and an IMR for a serving cell of a corresponding UE in each of the subframe sets.

And, when a plurality of IMRs are configured while a CoMP operation is performed, if total 3 CSI measurement objects are set to a UE, one of the 3 CSI measurement objects corresponds to an inter-cell CSI suitable for the CoMP operation and remaining two CSI measurement objects can be configured by a combination of an NZP CSI-RS resource and an IMR for a serving cell of the UE.

3. The Generals of Device Applicable to the Present Invention

Figure 17:
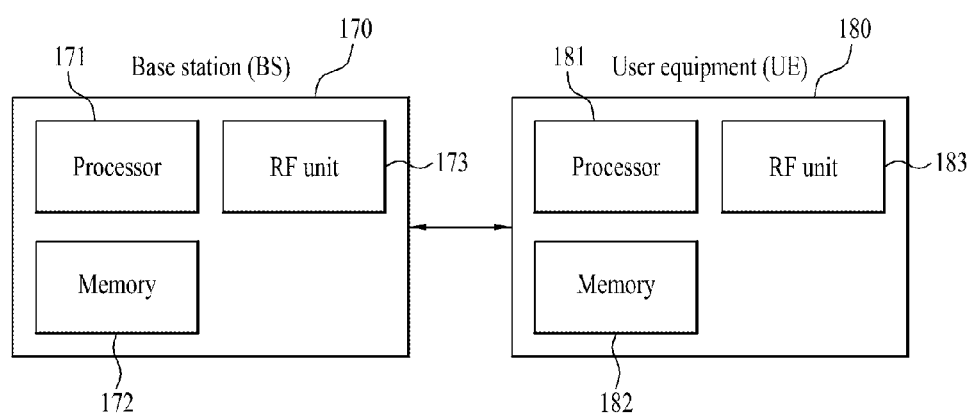
FIG. 17 is a block diagram for a wireless communication device according to one embodiment of the present invention.

FIG. 17 is a block diagram for a wireless communication device according to one embodiment of the present invention.

Referring to FIG. 17, a wireless communication system includes a base station 170 and a plurality of user equipments 180 located at a region of the base station 170.

The base station 170 includes a processor 171, a memory 172 and a RF (radio frequency) unit 173. The processor 171 is configured to implement a proposed function, a procedure and/or a method. Layers of a radio interface protocol can be implemented by the processor 171. The memory 172 is connected with the processor 171 and stores various informations to drive the processor 171. The RF unit 173 is connected with the processor 171 and is configured to transmit and/or receive a radio signal.

The user equipment 180 includes a processor 181, a memory 182 and a RF unit 183. The processor 181 is configured to implement a proposed function, a procedure and/or a method. Layers of a radio interface protocol can be implemented by the processor 181. The memory 182 is connected with the processor 181 and stores various informations to drive the processor 181. The RF unit 183 is connected with the processor 181 and is configured to transmit and/or receive a radio signal.

The memory 172/182 can be positioned at an inside or an outside of the processor 171/181 and can be connected to the processor 171/181 with a well-known means. And, the base station 170 and/or the user equipment 180 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although a method of transmitting and receiving data in a wireless access system proposed by the present invention is described with reference to examples applied to 3GPP LTE system, the method can be applied to various kinds of wireless access systems as well as the 3GPP LTE system.

What is claimed is:

1. A method for receiving channel state information (CSI) by a base station in a wireless access system supporting multiple component carriers (CCs), the method comprising:
transmitting information for configuring a plurality of CCs to a user equipment;
receiving, from the user equipment, a CSI measurement capability indicating a total number of CSI feedbacks measureable by the user equipment per each component carrier among the plurality of CCs;
transmitting, to the user equipment, information about a CSI measurement object configured for the user equipment, the CSI measurement object comprising a combination of a non-zero power (NZP) CSI-RS resource for measuring a signal usable for calculating the CSI and an interference measurement resource for measuring an interference usable for calculating the CSI; and
receiving, from the user equipment, CSI measured for the CSI measurement object, wherein the CSI measurement object is configured such that the total number of CSI measurement objects is restricted to being a number equal to or less than the CSI measurement capability, and
wherein the interference measurement resource is classified into a first subframe set in which a neighboring base station performs a silencing operation for time domain ICIC (inter-cell interference coordination) and a second subframe set in which the neighboring base station does not perform the silencing operation.

2. The method of claim 1, wherein the NZP CSI-RS resource is classified according to a reference signal transmission resource of each base station participating in CoMP (coordinated multi-point).

3. The method of claim 1, wherein the CSI measurement object comprises a measurement of the CSI for joint transmission by a plurality of base stations.

4. The method of claim 1, wherein the restriction on the total number of the CSI measurement object is applied to both a periodic CSI report and an aperiodic CSI report.

5. A method for transmitting CSI (channel state information) by a user equipment in a wireless access system supporting multiple component carriers (CCs), the method comprising:
configuring a plurality of CCs with a base station;
transmitting, to the base station, a CSI measurement capability indicating a total number of CSI feedbacks measureable by a the user equipment per each component carrier among the configured plurality of CCs;
receiving, from the base station, information about a CSI measurement object configured for the user equipment, the CSI measurement object comprising a combination of a non-zero power (NZP) CSI-RS resource for measuring a signal usable for calculating the CSI and an interference measurement resource for measuring an interference usable for calculating the CSI; and
transmitting, to the base station, CSI measured for the CSI measurement object, wherein the CSI measurement object is configured such that the total number of CSI measurement objects is restricted to being a number equal to or less than the CSI measurement capability, and
wherein the interference measurement resource is classified into a first subframe set in which a neighboring base station performs a silencing operation for time domain ICIC (inter-cell interference coordination) and a second subframe set in which the neighboring base station does not perform the silencing operation.

6. The method of claim 5, wherein the NZP CSI-RS resource is classified according to a reference signal transmission resource of each base station participating in CoMP (coordinated multi-point).

7. The method of claim 5, wherein the CSI measurement object comprises measurement of the CSI for joint transmission by a plurality of base stations.

8. The method of claim 5, wherein the restriction on the total number of the CSI measurement object is applied to both a periodic CSI report and an aperiodic CSI report.

9. A base station receiving CSI (channel state information) in a wireless access system supporting multiple component carriers (CCs), the base station comprising:
an RF (radio frequency) unit configured to transceive a radio signal; and
a processor configured to control the RF unit to:
transmit information for configuring a plurality of CCs to a user equipment, receive, from the user equipment, a CSI measurement capability indicating a total number of CSI feedbacks measureable by a user equipment per each component carrier among the plurality of CCs, and
transmit, to the user equipment, information about a CSI measurement object configured for the user equipment, and receive, from the user equipment, CSI measured for the CSI measurement object,
wherein the CSI measurement object comprises a combination of a non-zero power (NZP) CSI-RS resource for measuring a signal usable for calculating the CSI and an interference measurement resource for measuring an interference usable for calculating the CSI,
wherein the CSI measurement object is configured such that the total number of CSI measurement objects is restricted to being a number equal to or less than the CSI measurement capability, and
wherein the interference measurement resource is classified into a first subframe set in which a neighboring base station performs a silencing operation for time domain ICIC (inter-cell interference coordination) and a second subframe set in which the neighboring base station does not perform the silencing operation.

10. A user equipment transmitting CSI (channel state information) in a wireless access system supporting multiple component carriers (CCs), the user equipment comprising:
an RF (radio frequency) unit configured to transceive a radio signal; and
a processor configured to control the RF unit to:
configure a plurality of CCs with a base station,
transmit, to the base station, a CSI measurement capability indicating a total number of CSI feedbacks measureable by a the user equipment per each component carrier among the configured plurality of CCs, and
receive, from the base station, information about a CSI measurement object configured for the user equipment, and transmit CSI measured for the CSI measurement object, wherein the CSI measurement object comprises a combination of a non-zero power (NZP) CSI-RS resource for measuring a signal usable for calculating the CSI and an interference measurement resource for measuring an interference usable for calculating the CSI,
wherein the CSI measurement object is configured such that the total number of CSI measurement objects is restricted to being a number equal to or less than the CSI measurement capability, and
wherein the interference measurement resource is classified into a first subframe set in which a neighboring base station performs a silencing operation for time domain ICIC (inter-cell interference coordination) and a second subframe set in which the neighboring base station does not perform the silencing operation.

* * * * *